United States Patent
Suzuki et al.

[11] Patent Number: 6,096,446
[45] Date of Patent: Aug. 1, 2000

[54] MAGNETOOPTICAL RECORDING MEDIUM AND METHOD OF PRODUCING THE SAME

[75] Inventors: Takao Suzuki, Nagoya, Japan; William Van Drent, Somerville, Mass.; Yusuke Itoh, Nagoya, Japan

[73] Assignees: Toyota Jidosha Kabushiki Kaisha, Toyota; Toyota School Foundation, Nagoya, both of Japan

[21] Appl. No.: 09/159,607

[22] Filed: Sep. 24, 1998

[30] Foreign Application Priority Data

Sep. 30, 1997 [JP] Japan ................................ 9-266886

[51] Int. Cl.[7] ........................................ G11B 5/66
[52] U.S. Cl. ........................... 428/694 ML; 428/694 SC; 428/694 RE; 428/694 MM; 428/694 IS; 428/900; 428/336; 363/13
[58] Field of Search ................... 428/694 ML, 694 MM, 428/694 IS, 694 SC, 694 RE, 336, 900; 363/13

[56] References Cited

FOREIGN PATENT DOCUMENTS

| | | |
|---|---|---|
| 5-128600 | 5/1993 | Japan . |
| 06045176 | 2/1994 | Japan . |
| 6-60452 | 3/1994 | Japan . |
| 6-103621 | 4/1994 | Japan . |
| 6-70924 | 9/1994 | Japan . |
| 2-7-38357 | 4/1995 | Japan . |
| 7-38357 | 4/1995 | Japan . |
| WO 98/02876 | 1/1998 | WIPO . |

OTHER PUBLICATIONS

T. Suzuki, Magnetic and Magneto–Optic Properties of Rapid Thermally Crystallized Garnet Films (Invited), J. Appl. Phys. vol. 69, No. 8, pp. 4756–4760, Apr. 1991.

W. B. Zeper et al., Evaporated Co/Pt Layered Structures for Magneto–Optical Recording, IEEE Transactions on Magnetics, vol. 25, No. 5, pp. 3764–3766, Sep. 1989.

R. J. Gambino et al., Magneto–Optic Properties of Nd–Fe–Co Amorphous Alloys, J. Appl. Phys., vol. 57, No. 1, pp. 3906–3908, Apr. 1985.

T. Suzuki et al., Magnetic and Magneto–Optical Properties of (Nd, Pr)–(Fe, Co) Alloy Amorphous Films with Huge Perpendicular Magnetic Anisotropy, IEEE Transactions of Magnetics, vol. Mag–23, No. 5, pp. 2958–2960, Sep. 1987.

T. Suzuki et al., Magnetic and Magneto–Optical Properties of Nd–Th–Fe–Co Vertically Magnetized Films, IEEE Transactions on Magnetics, vol. 24, No. 6, pp. 3452–2454, Nov. 1988.

*Primary Examiner*—Leszek Kiliman
*Attorney, Agent, or Firm*—Oliff & Berridge, PLC

[57] ABSTRACT

To obtain a magnetooptical recording medium with a magnetooptic effect suitable for ultraviolet radiation, x-layers and y-layers are sequentially laminated on a glass substrate, where x is a TbFeCo layer and y is a Pt or NdCo layer. This multilayer thin film structure can provide a hysteresis loop of a rectangular ratio 1 because a vertical magnetic anisotropic constant Ku is larger than a demagnetizing energy of $2\pi Ms^2$ (where M is a saturated magnetization). FOM (Figure of Merit)=$R\sqrt{[\theta_k^2+\eta_k^2]}$ where $\theta_k$ is a Kerr rotation angle and $\eta_k$ is a Kerr ellipticity) is 0.05 or more in the range of ultraviolet rays (of a wavelength of 400 nm or less).

8 Claims, 27 Drawing Sheets

50Å TbFeCo(Pt) / XÅ Pt

X = 3

X = 6

X = 1 2

* R = Reflectance of Pt.

MAGNETOOPTICAL RECORDING MEDIUM AND METHOD OF PRODUCING THE SAME

BACKGROUND OF THE INVENTION

1. Field of the Invention

The present invention relates to a magnetooptical recording medium which records information utilizing a magnetooptic effect to ultraviolet radiation with a wavelength of less than 400 nm of a metal thin film or multilayer thin film and to a method of producing the same.

2. Description of the Related Art

Conventionally, metal films including a TbFeCo (Terbium/Iron/Cobalt) amorphous film, a Bi (bismuth)-Substitutional garnet thin film, and CoPt (Cobalt/platinum) multilayer thin film have been widely used as magnetooptical recording mediums. These thin films are significant to a polar rotation angle (hereinafter merely referred to as Kerr rotation angle) or Kerr ellipticity (e.g. more than 0.1°) of a magnetooptic effect to visible rays ranging 400 to 860 nm. Those thin films have a large vertical magnetic anisotropy which provides the magnetization direction perpendicular to the thin film. Typically, the TbFeCo amorphous thin film family is practically used.

An amorphous film of TbFeCo is disclosed in a paper written by T. Suzuki, J. Appl. Phys. 69(8), pp 4756–4760 (1991) and both Bi-substitution garnet thin film and CoPt multilayer thin film are disclosed in a paper written by W. B. Zeper, F. Greidanus and P. F. Carcia; IEEE Trans. MAG25, pp 3764–3766 (1989).

There has been a strong demand to increase the recording density of the recording medium. Although a magnetooptical recording medium can record data of a higher density as compared to a conventional magnetic recording medium, further increases in the recording density of the magnetooptical recording medium are desired.

Techniques including the magnetic super-resolution method and the magnetic domain expanding method have been proposed to increase recording density. Basically, the spot diameter of a recording beam must be decreased by shortening the wavelength of light.

The TbFeCo amorphous thin film, currently and popularly used as a magnetooptical recording medium, has a Kerr rotation angle of more than 0.3° adjacent to a wavelength of 760 nm. However, it is well-known that the Kerr rotation angle and Kerr ellipticity decrease as the wavelength is shortened, so that the reproduced signal strength remarkably decreases. It is predicted that shortening the wavelength of light will lead to enable optical recording in high density by ultraviolet rays. For that reason, the TbFeCo series amorphous thin film currently used cannot be used for the magnetooptical recording medium which uses a short-wavelength beam such as ultraviolet ray.

It is known that the Co-Pt multilayer thin film, or Bi-substitution garnet thin film has a large polar Kerr effect near to 400 nm or more. However, since these materials have a crystalline structure and produce large reproduction noises due to the crystalline grains, they are unsuitable in practical use.

Since the R-TM alloy thin film (where R is a rare earth element such as Tb or Dy, and TM is a transition metal such as Fe, Co, or Ni) has an amorphous structure, the grain noise is very small (by 5 to 10 dB (30 kHz band width)) and the S/N ratio is large, compared with the crystalline film. This alloy thin film is put to practical use. Much study and research has been devoted to the alloy thin film to improve the Kerr rotation angle for short wavelengths. For example, the enhancement effect of Pt is disclosed in Japanese Patent Laid-Open Publication No. Hei 5-128600 (JP-A-05-12860), while the enhancement effect of a light rare earth element is disclosed in Japanese Patent Nos. 1949740(JP-B-1949740) and 2026003(JP-B-2026003), and in Japanese Patent Laid-Open Publication Nos. 6-103621(JP-A-06-103621) and 6-60452(JP-A-06-60452).

However, with the exception of Japanese Patents No. 1949740 and 2026003, these references only discuss a wavelength region $\lambda \geq 400$ nm (a photon energy of less than about 3 eV). Although Japanese Patents No. 1949740 and 2026003 disclose experimental data for the wavelengths reaching 200 nm, they do not disclose accurate measurements of wavelengths less than 400 nm because of light absorption. Therefore, wavelengths shorter than 400 nm have not been studied.

A magnetooptical recording medium requires a large vertical magnetization anisotropy to obtain an orientation of magnetization perpendicular to the film surface. Specifically, it is necessary to set the magnetic anisotropic constant Ku to a value larger than the demagnetizing field energy $2\pi Ms^2$.

A magnetooptical recording medium which has a sufficient magnetooptic effect and a large vertical magnetic anisotropy in the ultraviolet-ray region is therefore greatly desired.

SUMMARY OF THE INVENTION

An objective of the present invention is to provide a magnetooptical recording medium which has a magnetooptic effect suitable for ultraviolet radiation.

Another objective of the invention is to provide a method of producing a magnetooptical recording medium which has a magnetooptic effect relative to ultraviolet radiation.

A magnetooptical recording medium according to the present invention may comprise a (R–TM) thin film, where R is a rare earth element of 15 to 50 by atomic % and TM is an iron group transition metal; at least 70% of R being Tb and/or Dy and the remainder of R being at least one element selected from the group consisting of Y, La, Ce, Sm, Gd, Tb, Dy, Ho, Er, and Yb; the TM being Fe and/or Co; the content of the Fe ranging 0 to 100%; the magnetooptical recording medium having a vertical magnetic anisotropic constant Ku larger than a demagnetizing field energy of $2\pi Ms^2$ (where Ms is a saturation magnetization); and FOM (Figure of Merit)=$R\sqrt{[\theta_k^2+\eta_k^2]}$ is 0.05 or more in a range of ultraviolet radiation with a wavelength of 400 nm or less, where $\theta_k$ is a Kerr rotation angle and $\eta_k$ is a Kerr ellipticity.

Another magnetooptical recording medium according to the present invention comprises a (R–TM–M) thin film, where R is a rare earth element of 15 to 50 by atomic %, TM is an iron group transition metal and M is a metal; at least 70% of R is Tb and/or Dy, and the remainder of R being at least one element selected from the group consisting of Y, La, Ce, Sm, Gd, Tb, Dy, Ho, Er, and Yb; the TM being Fe and/or Co; the content of the Fe ranging 0 to 100%; M is at least one element selected from the group consisting of Pt, Ta, Pd, Zr, Nb, Mo, Ru, Rh, Cu, Ag, Au, and W; the magnetooptical recording medium has a vertical magnetic anisotropic constant Ku larger than a demagnetizing field energy of $2\pi Ms^2$ (were Ms is a saturated magnetization); and FOM (Figure of Merit)=$R\sqrt{[\theta_k^2+\eta_k^2]}$ is 0.05 or more in a range of ultraviolet radiation with a wavelength of 400 nm or less, where $\theta_k$ is a Kerr rotation angle and $\eta_k$ is a Kerr ellipticity.

According to the present invention, a multilayer thin film may be formed of either a (R–TM) thin film and a M' thin film, or a (R–TM–N) thin film and a M' thin film.

The M' thin film is formed of at least one element selected from the group consisting of Pt, Ta, Pd, Zr, Nb, Mo, Ru, Rh, Cu, Ag, Au, and W. The magnetooptical recording medium has a vertical magnetic anisotropic constant Ku larger than a demagnetizing field energy of $2\pi Ms^2$ (where Ms is a saturated magnetization), and FOM (Figure of Merit)=R $\sqrt{[\theta_k^2+\eta_k^2]}$ is 0.05 or more in a range of ultraviolet radiation with a wavelength of 400 nm or less, where $\theta_k$ is a Kerr rotation angle and $\eta_k$ is a Kerr ellipticity.

Moreover, according to the present invention, the M' thin film may preferably have a thickness of 15 Å or less.

According to the present invention, a multilayer thin film is formed of either a (R–TM) thin film and a (R+TM') thin film or a (R–TM–M) thin film and a (R–TM') thin film. R' is a rare earth element of Nd and/or Pr of 20 to 80 by atomic % and the remaining R' contains at least one element selected from the group consisting of Y, La, Ce, Sm, Gd, Tb, Dy, Ho, Er and Yb, while TM' contains Fe and/or Co. The magnetooptical recording medium has a vertical magnetic anisotropic constant Ku larger than a demagnetizing field energy of $2\pi Ms^2$ (where Ms is a saturated magnetization), and FOM (Figure of Merit)=R$\sqrt{[\theta_k^2+\eta_k^2]}$ is 0.05 or more in a range of ultraviolet radiation with a wavelength of 400 nm or less, where $\theta_k$ is a Kerr rotation angle and $\eta_k$ is a Kerr ellipticity.

The above-mentioned magnetooptical recording medium can preferably be produced by forming a thin film on a substrate using the metal gal condensing method.

In the magnetooptical medium, FOM (Figure of Merit)=R $\sqrt{[\theta_k^2+\eta_k^2]}$, where $\theta_k$ is a Kerr rotation angle and $\eta_k$ is a Kerr ellipticity) is 0.05 or more in a range of ultraviolet radiation with a wavelength of 400 nm or less. This feature enables high density recording and reproduction to be performed using ultraviolet radiation with a small spot diameter.

Such a metal film according to the present invention has a vertical magnetic anisotropic constant Ku larger than a demagnetizing field energy of $2\pi Ms^2$ (where Ms is a saturated magnetization). Hence, the metal thin film has a vertical magnetic anisotropy that is radial to the magnetooptical recording medium. High-density magnetooptical recording can be achieved by utilizing this vertical magnetic anisotropy. The metal thin film has a negative Kerr rotation angle to visible rays. However, as the wavelength of the irradiated light is shortened, the absolute value of the Kerr rotation angle increases and then decreases. The metal thin film may have a positive Kerr rotation angle is a short wavelength range. A sufficiently large FOM can be obtained in the range of ultraviolet rays of less than 400 nm.

A multilayer thin film wherein the (R–TM) or (R–TM–M) film and the M' film are alternately laminated can provide a large FOM value. Hence a suitable magnetooptical recording medium with a large FOM can be obtained by utilizing the multilayer thin film structure.

Because the M' film is not a magnetic thin film, an excessively thick M' film causes the coercive force to be decreased, so that recording and reproduction can not be sufficiently accomplished. A sufficient magnetooptic effect can be obtained by setting the M' film to a thickness of less than 15 Å, while the coercive force can be maintained at more than a predetermined value.

A multilayer thin film where the (R–TMN) or (R–TM–M) film and the (R'–TM') film are alternately laminated can provide a sufficiently large magnetooptic effect as well as a sufficient vertical magnetic anisotropy. Preferably, a heavy rare earth element is utilized as R, while a light rare earth element such as Nd or Pr is utilized as R'.

For combinations of a rare earth metal and a transition metal, combinations of a heavy rare earth metal and Fe are the most common for vertical magnetic films. TbFe, GdFe, DyFe, GdTbFe, TbDyFe, and the like are typical of such combinations. For example, TbFe is characterized by a Curie point Tc of 140 to 250° C., a Kerr rotation angle $\theta_k$ of approximately 0.3°, a saturated magnetization Ms of 50 to 100 emu/cc, and a vertical magnetic anisotropic constant Ku of $10^5$ to $10^6$ erg/cc.

Heavy rare earth elements such as Tb, Dy, or Gd are rare resources in the Earth's crust and require a very complicated separation process. As a result, these elements are very expensive.

Because the atomic magnetic moment of the heavy rare earth element and the atomic magnetic moment of Fe are coupled to each other reversely and in parallel, the saturated magnetization Ms and the Currie point Tc depend largely on the composition, so that it is difficult to mass-produce uniform, quality products. Unlike the heavy rare earth elements, light rare earth elements such as Nd and Pr are broadly distributed in the Earth's crust.

Although it has been previously reported that, while the light rare earth metal-iron group transition metal amorphous thin film typified by NdFe increases its magnetooptic effect as the wavelength of light is shortened, it sharply decreases around a wavelength of 400 nm, an experiment by the present inventors found that the absolute value of the Kerr rotation angle increases even for wavelengths less than 400 nm (International Application No. PCT/JP97/02415). It is considered that the enhancement effect results from an effect of the light rare earth element.

It has been reportedly considered that the amorphous thin film made of a light rare earth element and iron has a high saturated magnetization but cannot provide a vertical magnetic anisotropic energy which can cancel the demagnetizing field effect of the thin film. Moreover, since the hysteresis loop of a magnetic curve does not indicate a sufficiently large vertical magnetic anisotropy, but has the so-called "Snake" curve, it is impossible to have a hysteresis loop with a large rectangular ratio. This poor rectangular ratio makes a recording bit unstable and deteriorates the S/N ratio.

However, the light rare earth element-iron group transition metal amorphous thin film according to the present invention can provide a large magnetic magnetooptic effect in the region of ultraviolet radiation. Moreover, the multilayer thin film structure according to the present invention can provide a hysteresis loop with a high rectangular characteristic. Moreover, the use of the light rare earth element-iron group transition metal amorphous thin film according to the present invention allows a sufficient vertical magnetic anisotropy and a sufficient rectangular ratio to be obtained. In addition, the consumption of heavy rare earth elements can be reduced.

BRIEF DESCRIPTION OF THE DRAWINGS

This and other objects, features, and advantages of the present invention will become more apparent upon a reading of the following detailed description and drawings, in which.

DESCRIPTION OF THE PREFERRED EMBODIMENTS

Next, preferred embodiments of the present invention will be described below with reference to the attached drawings.

A thin film is first deposited on a substrate through a sputtering and vapor-depositing process. An RF magnetron sputtering process or DC magnetron sputtering process may be employed as the sputtering process. The magnetooptical recording medium according to the present invention can also be produced with various metal gas condensing methods, and is not limited to the above-mentioned sputtering process. For example, ion beam sputtering, MBE (molecular beam epitaxy), CVD (chemical vapor deposition), or vacuum deposition may also be used with this invention.

In an experiment to be described later, $Tb_{28}Fe_{64.8}Co_{7.2}$ and Pt were used as the target material.

Figure 1:
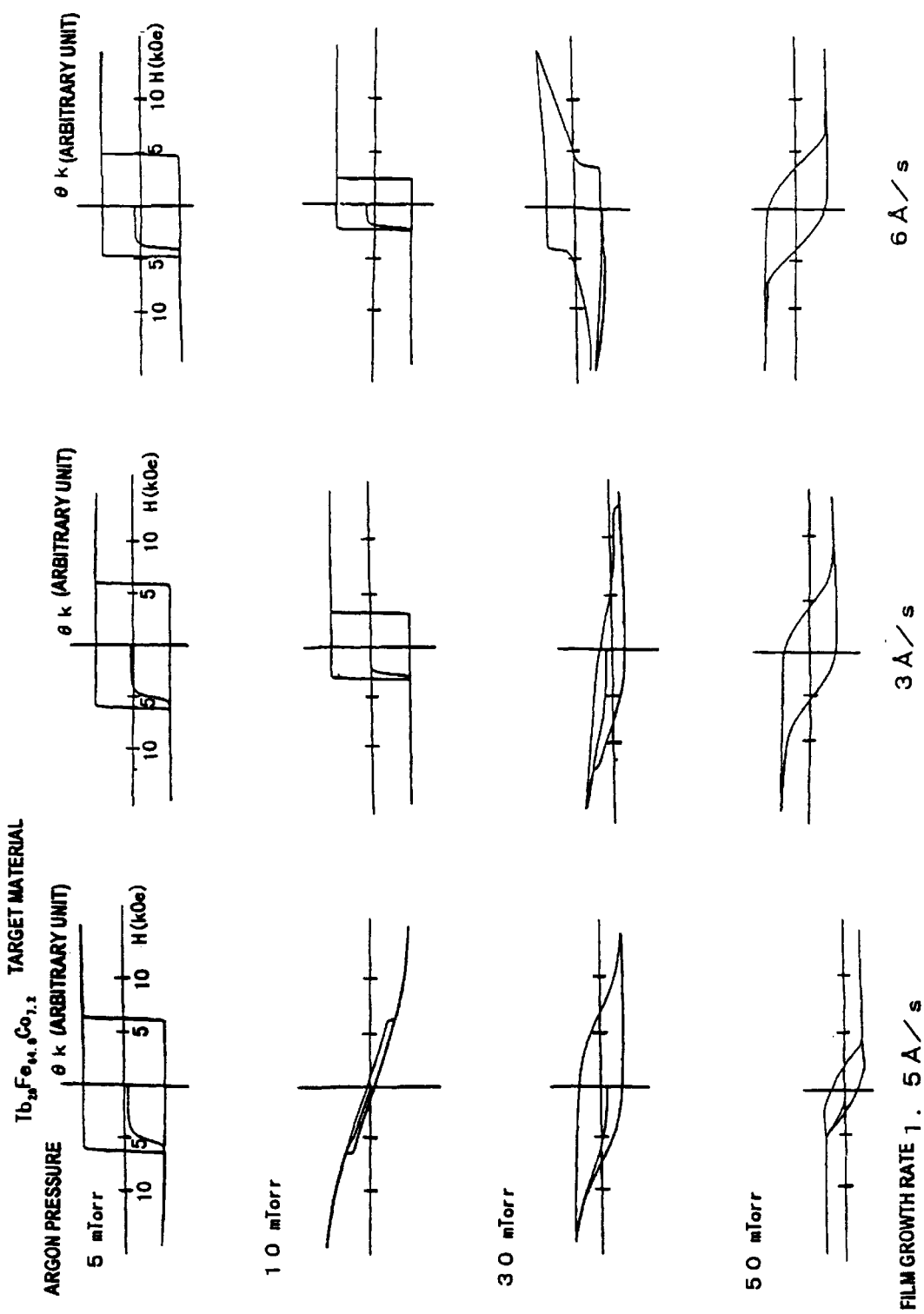
FIG. 1 is a diagram illustrating the argon pressure dependency and deposition rate dependency on the hysteresis loop of a TbFeCo single-layer film.

FIG. 1 shows the dependency on argon pressure and deposition rate of the hysteresis loop of a $TB_{23}(FeCo)_{77}$ single layer. Referring to FIG. 1, the rectangular ratio is 1 to all film growth rates under a pressure of 5 mTorr. The slower the film growth rate, the larger the coercive force (Hc).

The conditions for production of a TbFeCo layer, Pt, and NdCo are decided based on the experimental results. Particularly, the film growth rate is set to a slower value to obtain a higher coercive force. That is, the film growth rate at the atmosphere or argon under a pressure of 5 mTorr is about 0.5 Å/sec.

The substrate is a glass substrate and the substrate temperature is maintained at a room temperature. The entire multilayer thin film structure is formed of a XÅTbFeCo/YÅPt film, where X=10 to 50, and Y=0.5 to 12.

Figure 2:
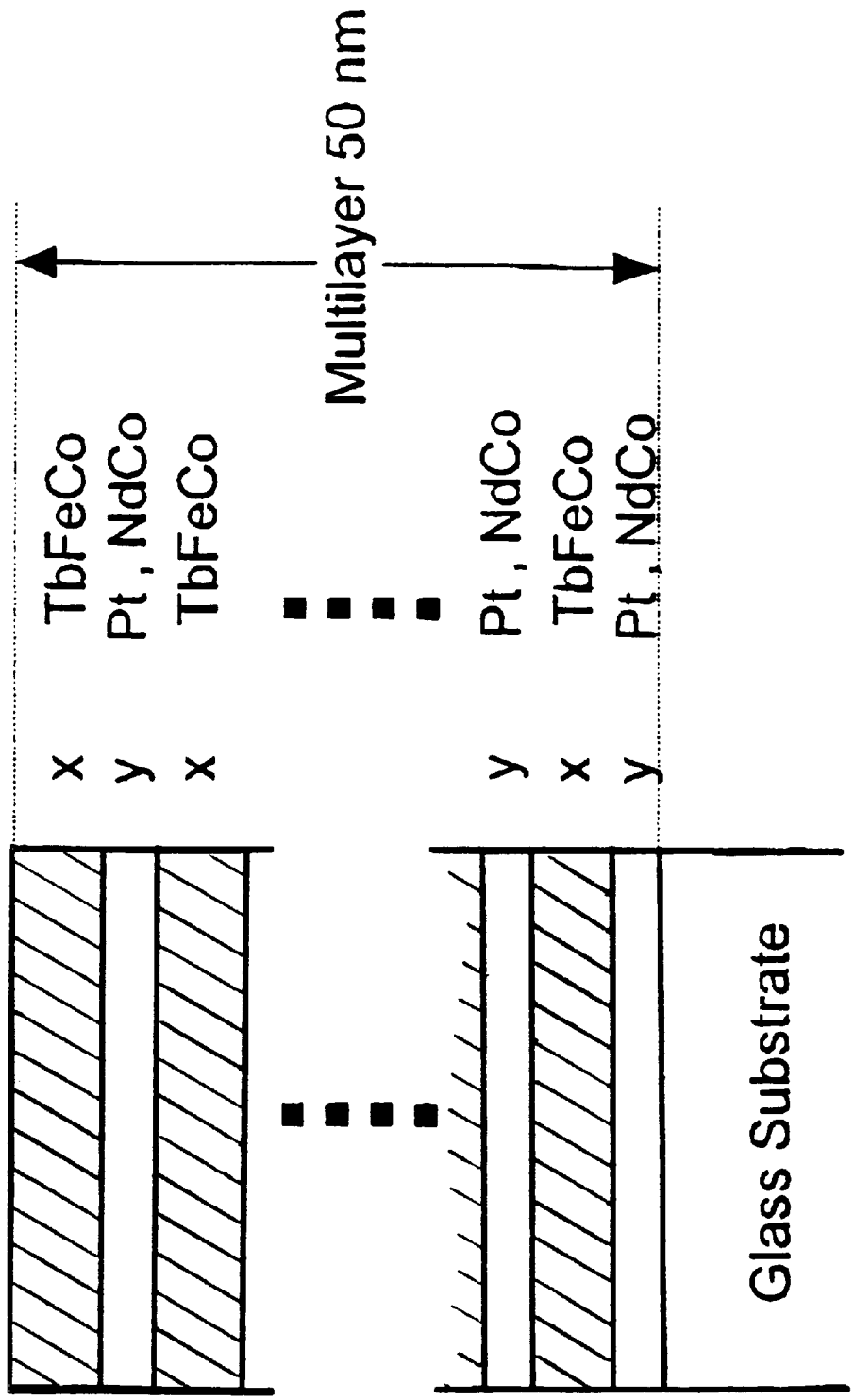
FIG. 2 is a diagram illustrating the schematic structure of a multilayer thin film according to the first and second embodiments.

FIG. 2 shows a schematic structure of a metal multilayer thin film for a magnetooptical recording medium. A y-layer and a x-layer are sequentially laminated on the glass substrate, where x is a TbFeCo layer and y is a Pt or NbCo layer. The thickness of the entire thin film is about 500 Å.

As the x-layer is used a (R–TM) film formed of a rare earth element R by 15 to 50 atomic % (where 70% of R or more is Tb and/or Dy and the remaining of R is at least one selected from the group consisting of Y, La, Ce, Sm, Gd, Tb, Dy, Ho, Er, and Yb) and an iron group transition metal TM (where TM is formed of Fe of 0 to 100% and Co). The x-layer may preferably contain M of several % or less (where M is at least about one element selected from the group consisting of Pt, Ta, Pd, Zr, Nb, Mo, Ru, Rh, Cu, Ag, Au, and W). The x-layer may formed of a single layer of Pt, Ta, Pd, Zr, Nb, Mo, Ru, Rh, Cu, Ag, Au, or W.

The y-layer may be preferably formed of M' of at least one selected from the group consisting of Pt, Ta, Pd, Zr, Nb, Mo, Ru, Rh, Cu, Ag, Au, and W). The y-layer may be preferably formed of a (R'–TM') thin film, where R', representing a rare earth element, that is, Nd and/or Pr of 20 to 80% by atomic %, and the remaining of R' is at least one element selected from the group consisting of Y, La, Ce, Sm, Gd, Tb, Dy, Ho, Er, and Yb, and TM' is of Fe and/or Co.

Those metal films are characterized in that the vertical magnetic anisotropic constant Ku is larger than a demagnetizing field energy of $2\pi Ms^2$ (where Ms is a saturated magnetization) and that FOM (Figure of Merit)=R $\sqrt{[\theta_k^2 + \eta_k^2]}$ is 0.05 or more within a range of ultraviolet rays of a wavelength of 400 nm or less), where $\theta_k$ is a Kerr rotation angle and $\eta_k$ is a Kerr ellipticity ratio.

Embodiment 1

A metal multilayer thin film of TbFeCo/Pt is formed using the sputtering and vaporizing process. A Pt layer is used as the y-layer shown in FIG. 2. The total thickness is about 500 Å.

Figure 3:
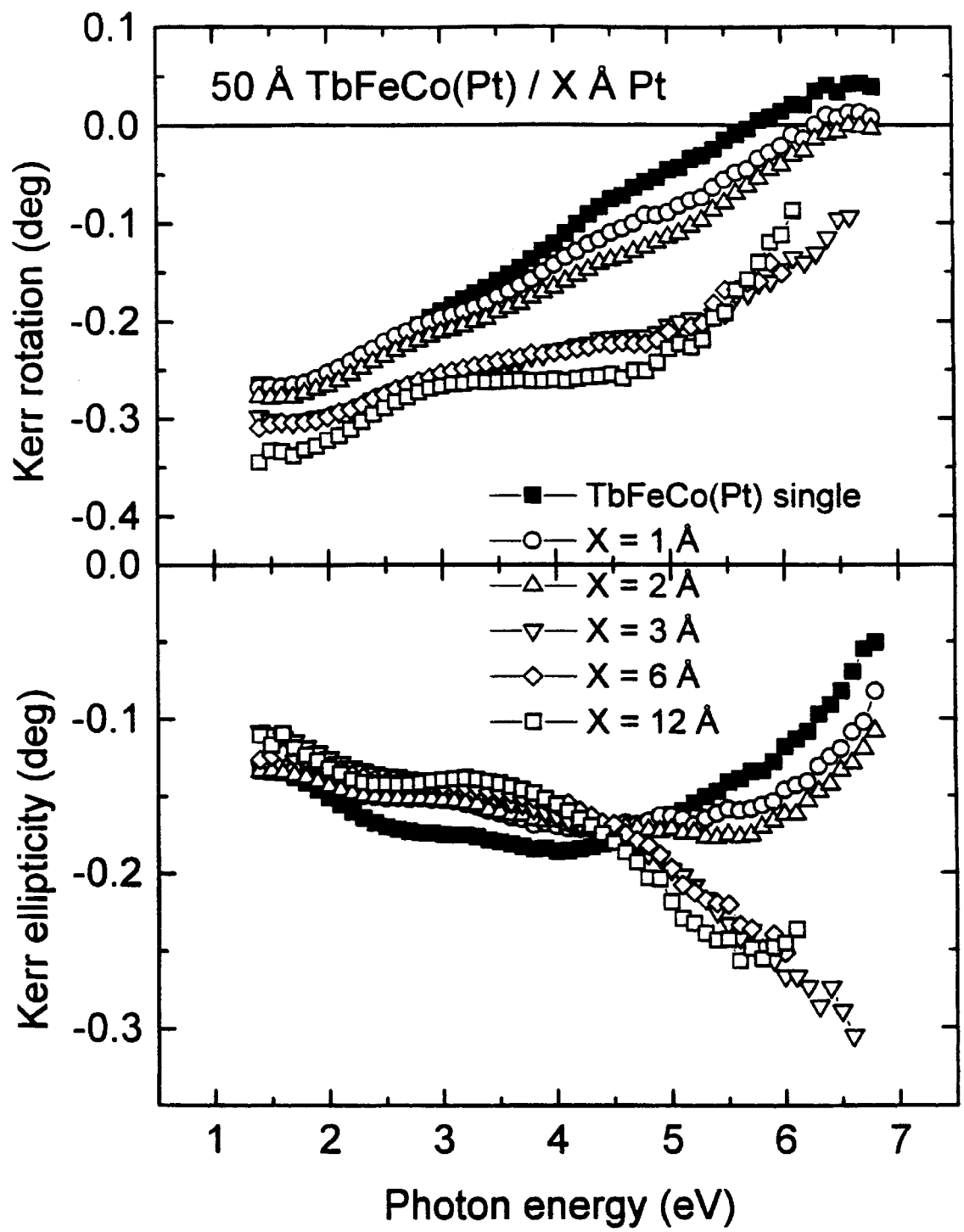
FIG. 3 is a diagram illustrating the photon energy dependency on the Kerr rotation angle and Kerr ellipticity of a 50 Å TbFeCo(Pt)/XÅPt film (where X=0, 1, 2, 3, 6, and 12)

FIG. 3 shows the dependency on photon energy of Kerr rotation angle (in degree) and Kerr ellipticity (in degree) of a 50 Å TbFeCo(Pt)/XÅpt film (where X=0, 1, 2, 3, 6, and 12 Å). The wavelength (Å) is represented by 12400/photon energy. The content of Pt in TbFeCo(Pt) is 0.5% or less.

It is understood that the absolute value of a Kerr rotation angle increases over all photon energy ranges as Pt increases. The absolute value of a Kerr ellipticity $\eta_k$ decreases at less than 4.5 eV (2,756 Å), but tends to increase at 4.5 or more eV.

Figure 4:
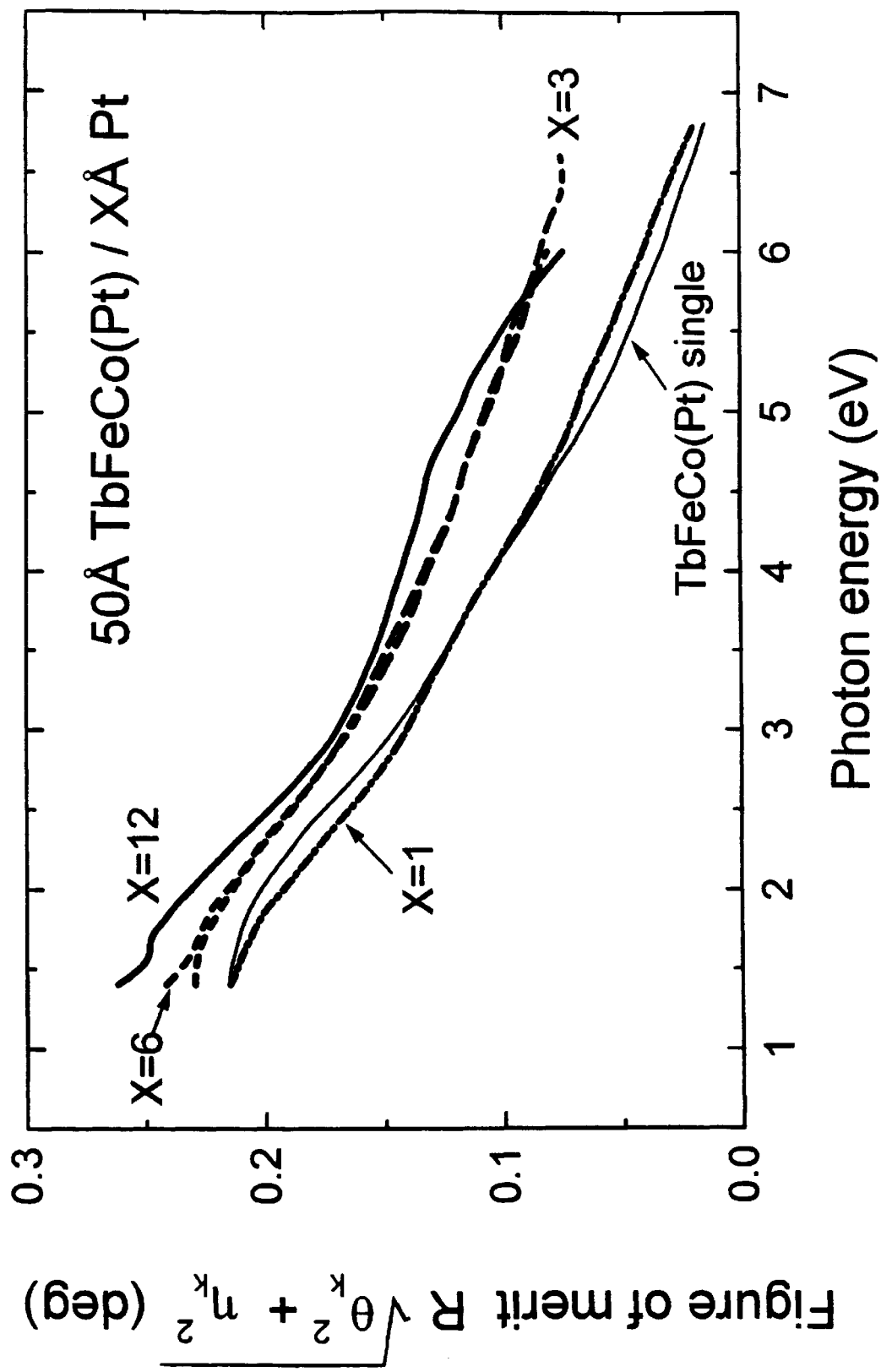
FIG. 4 is a diagram illustrating the photon energy dependency on the FOM value of a 50 ÅTbFeCo(Pt)/XÅPt film (where X=0, 1, 3, and 12)

FIG. 4 shows a dependency on photon energy of the FOM value of a 50 ÅTbFeCo(Pt)/XÅPt film (where X=1, 3, 6, and 12 Å). When X=3, 6, and 12 Å, the FOM increases.

Figure 5:
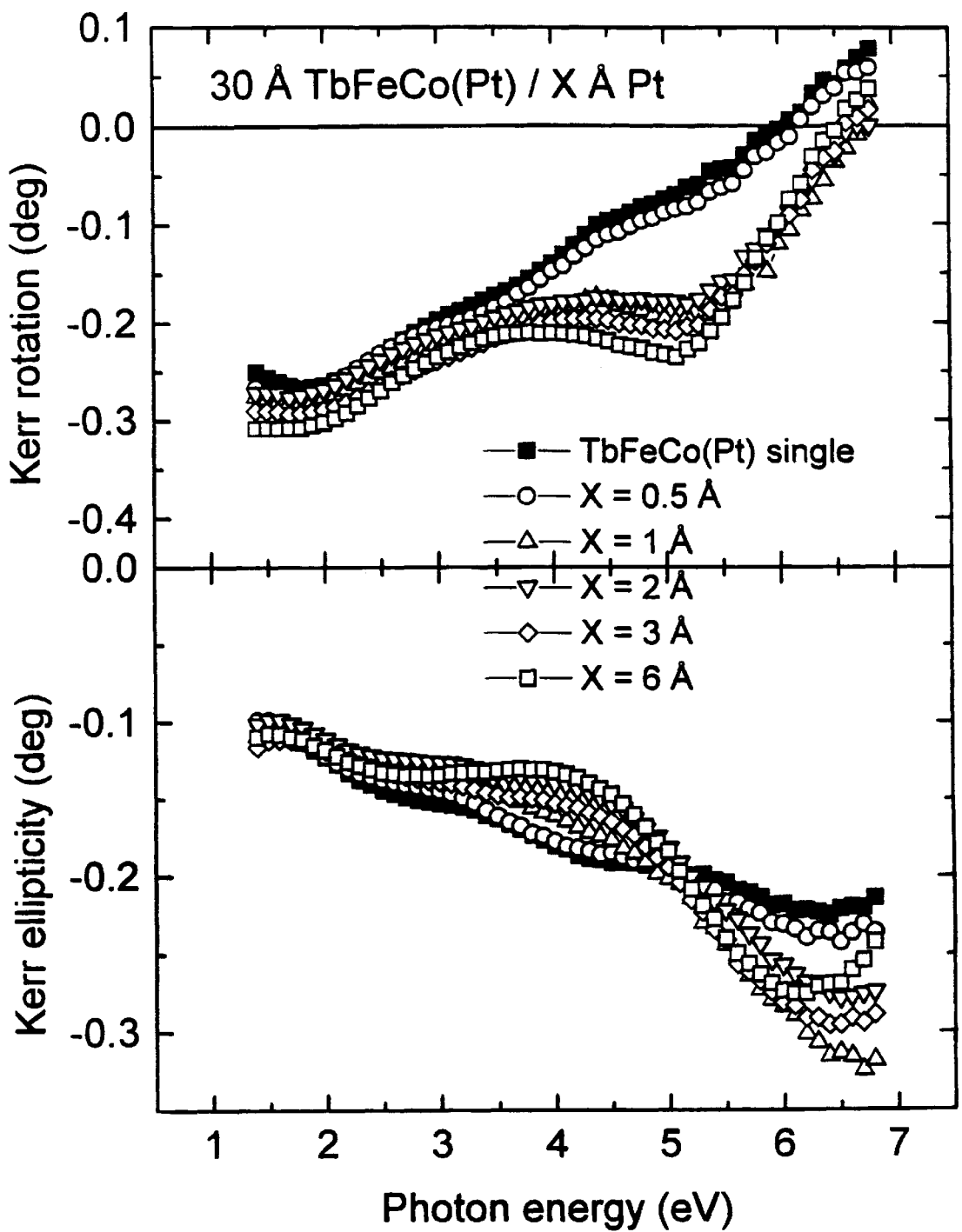
FIG. 5 is a diagram illustrating the photon energy dependency on the Kerr rotation angle and Kerr ellipticity of a 30 Å TbFeCo(Pt)/XÅPt film (where X=0, 0.5, 1, 2, 3, and 6)

FIG. 5 shows a dependency on photon energy of the Kerr rotation angle and Kerr ellipticity of a 30 ÅTbFeCo(Pt)/XÅ film (where X=0.5, 1, 2, 3, and 6 Å). The absolute value of a Kerr rotation angle increases with an increase in Pt. The absolute value of a Kerr ellipticity increases at 5 eV or more with an increase in Pt.

Figure 6:
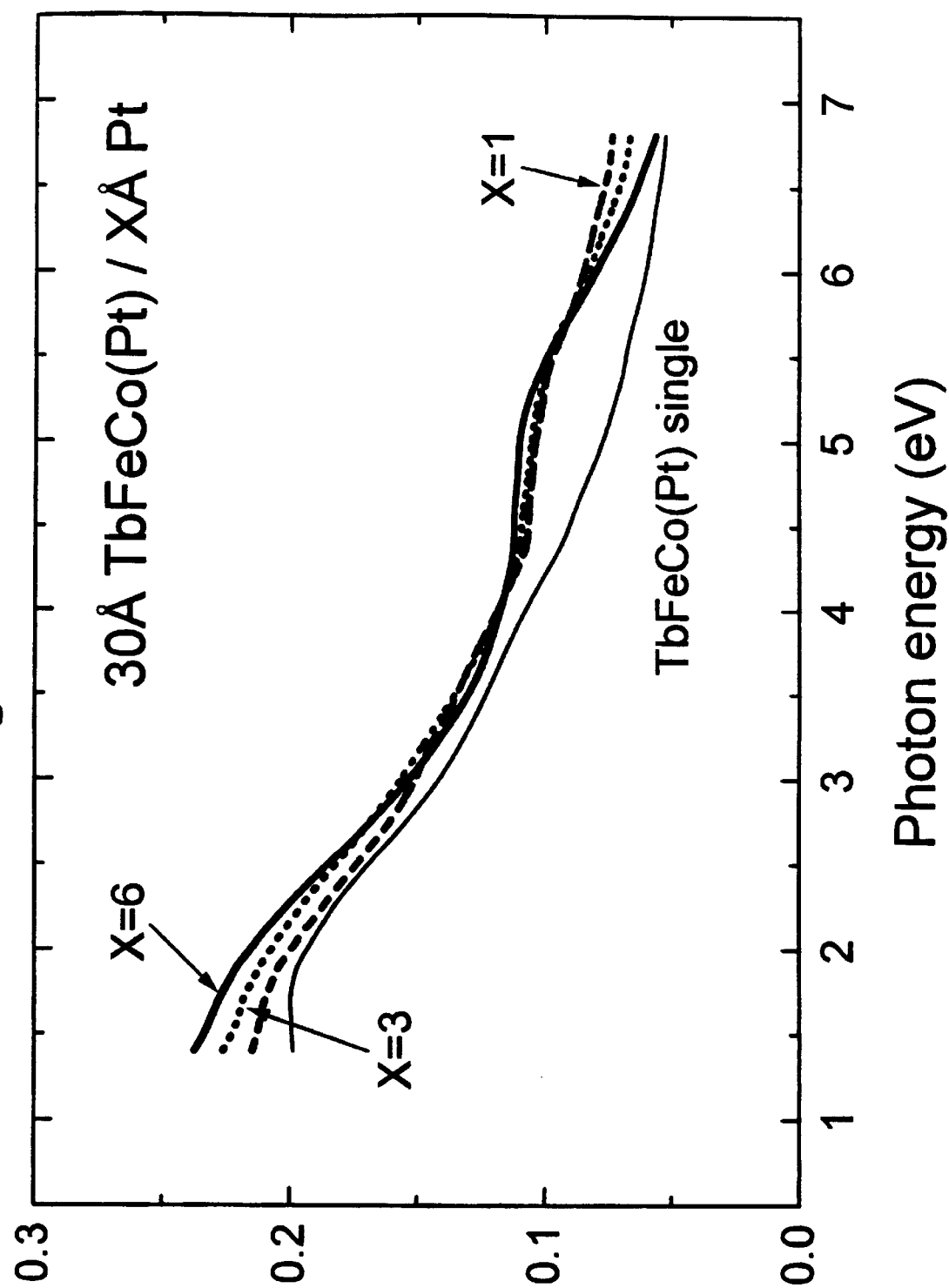
FIG. 6 is a diagram illustrating the photon energy dependency on the FOM value of a 30 ÅTbFeCo(Pt)/XÅPt film (where X=0, 1, 3, and 6)

FIG. 6 shows a dependency on photon energy of the FOM value of a 30 ÅTbFeCo(Pt)/XÅPt film. The FOM value increases over all X values including 6 Å, compared with that of the TbFeCo single layer.

Figure 7:
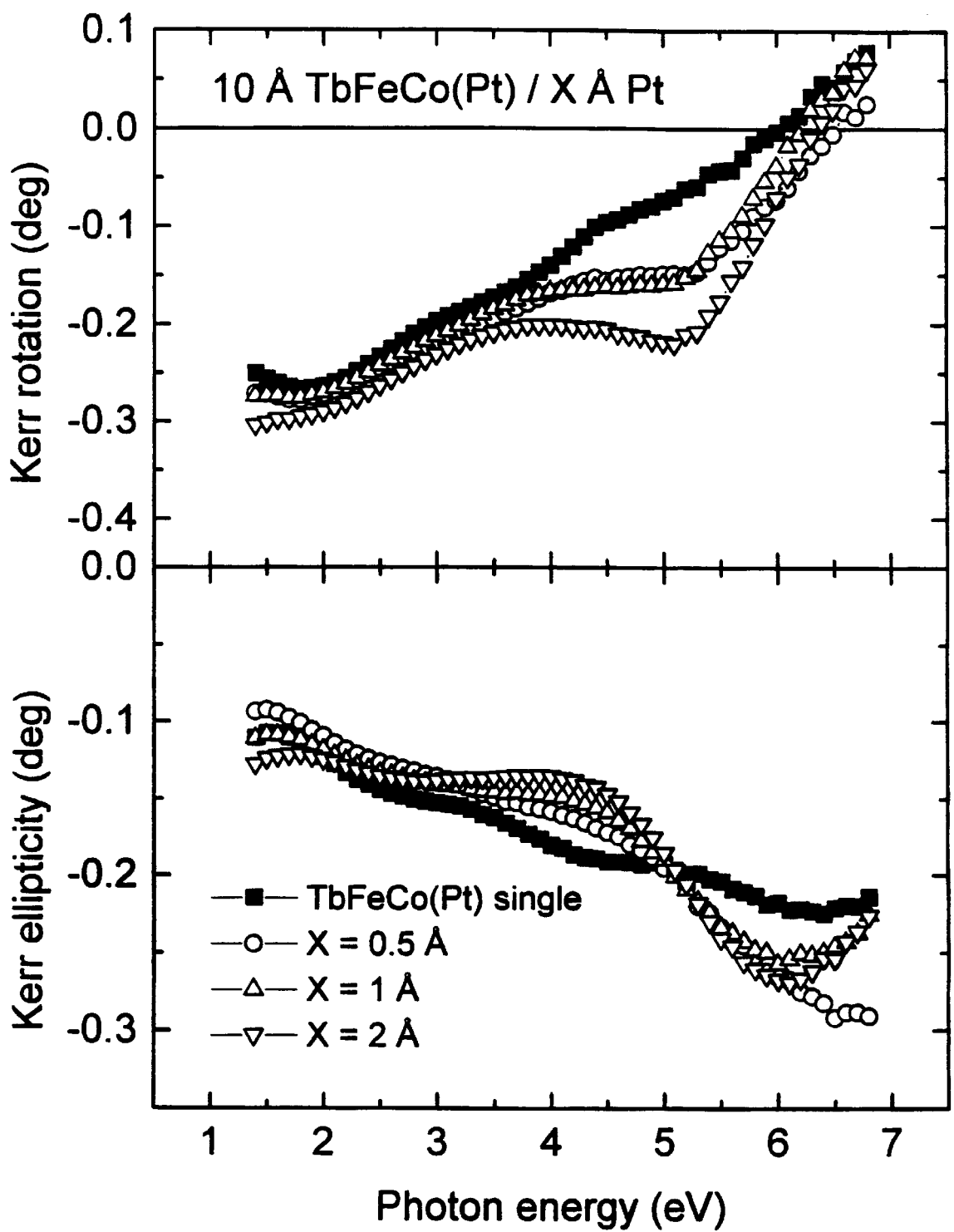
FIG. 7 is a diagram illustrating the photon energy dependency on the Kerr rotation angle and Kerr ellipticity of a 10 Å TbFeCo(Pt)/XÅPt film (where X=0, 0.5, 1, and 2)

FIG. 7 shows a dependency on photon energy of the Kerr rotation angle and Kerr ellipticity of a 10 ÅTbFeCo(Pt)/XÅPt film (where X=0.5, 1, and 2 Å). The absolute value of Kerr rotation angle increases with an increase in Pt while the absolute value of Kerr ellipticity increase at 5 eV or more with an increases in Pt.

Figure 8:
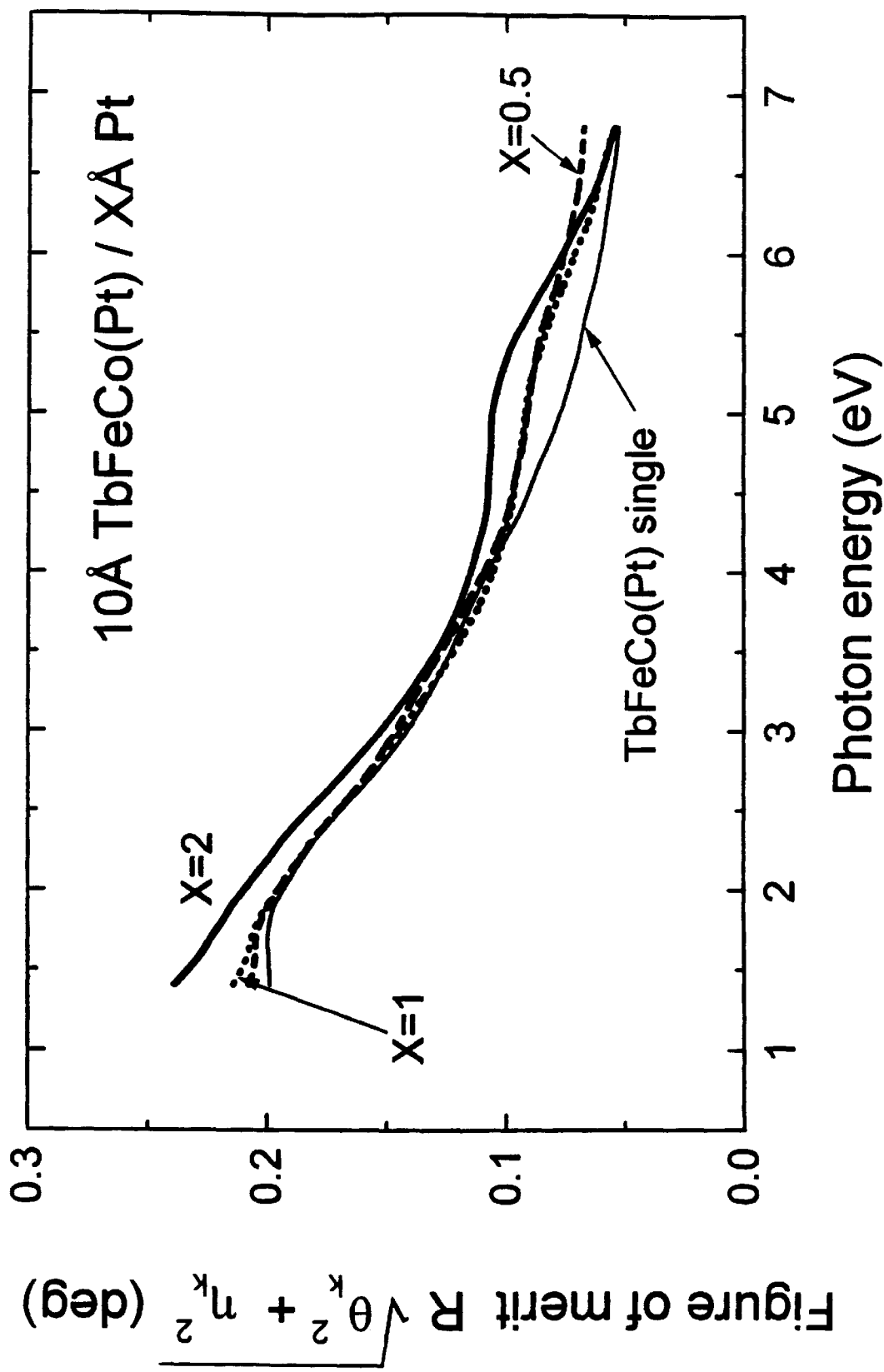
FIG. 8 is a diagram illustrating the photon energy dependency on the FOM value of a 10 ÅTbFeCo(Pt)/XÅPt film (where X=0, 0.5, 1, and 2)

FIG. 8 shows a dependency on photon energy of the FOM value of a 10 ÅFeCo(Pt)/XÅPt film (where X=0.5, 1, and 2 Å). Particularly, in the case of X=2 Å, this film structure can provide a larger FOM value than that of the single layer film over all wavelength ranges.

Figure 9:
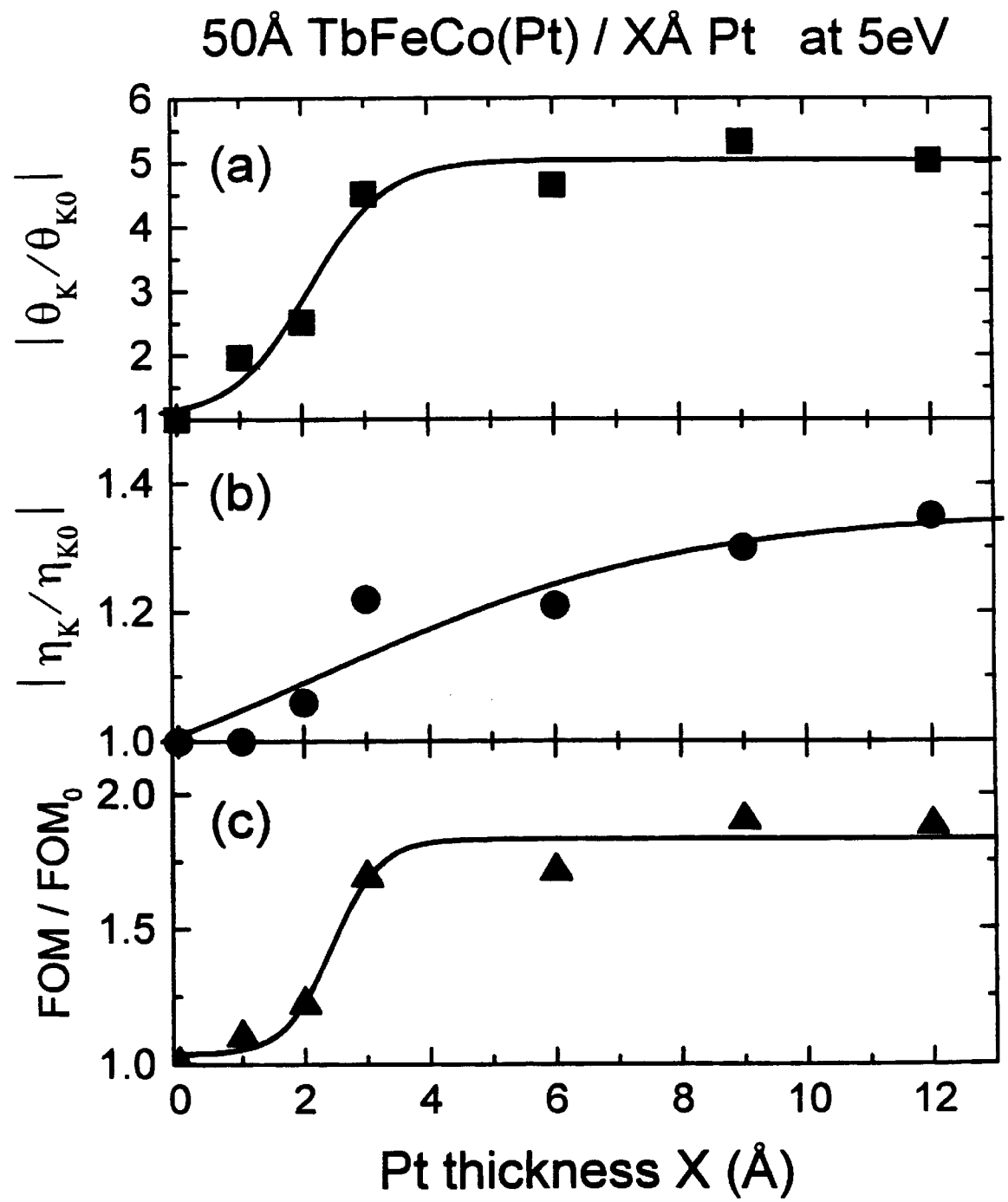
FIG. 9 is a diagram showing the dependency on Pt thickness of the Kerr rotation angle, Kerr ellipticity, and FOM values of a 50 ÅTbFeCo(Pt)/XÅPt film (5 eV)

FIG. 9 shows a composition between a 50 ÅTbFeCo(Pt)/XÅPt film and a single layer film of TbFeCo in (a) Kerr rotation angle $\theta_k$, (b) Kerr ellipticity $\eta_k$ and (c) FOM value at a photon energy of 5 eV. The Kerr rotation angle and Kerr ellipticity tend to be saturated with the Pt film of about 3 Å. Under the above-mentioned condition, a sufficient effect can be obtained with the Pt layer of about 3 Å.

Figure 10:
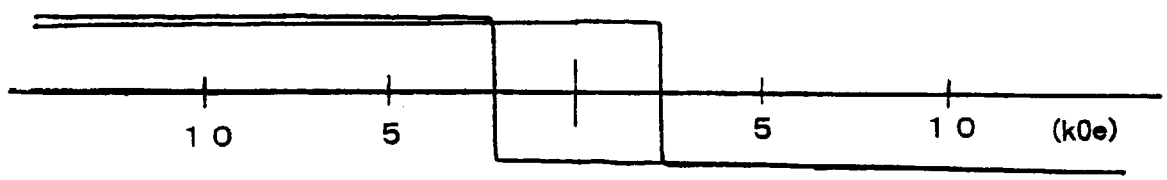
FIG. 10 is a diagram illustrating the hysteresis loop of a 50 ÅTbFeCo(Pt)/XÅPt film (where X=3, 6, and 12)
Figure 10:
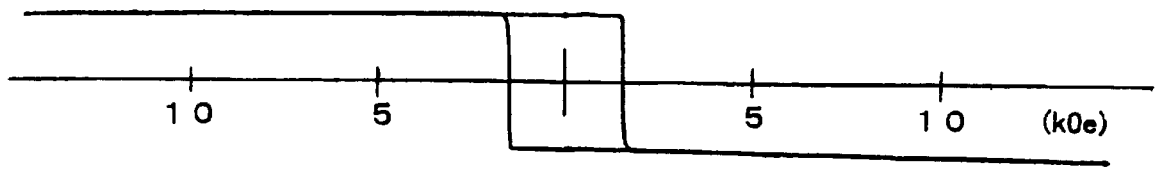
Figure 10:
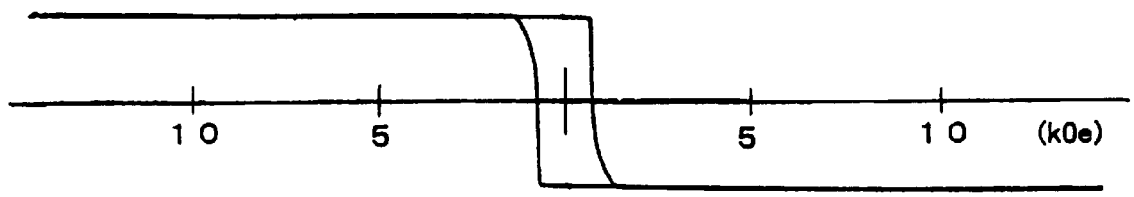

FIG. 10 shows the hysteresis loop of a Kerr effect (X=3, 6, and 12 Å). The applied magnetic direction is perpendicular to the film surface. Any one of the films has a large vertical magnetic anisotropy Ku and the magnetization direction is perpendicular to the film surface with no magnetic direction applied. As the thickness of the Pt film increases, the coercive force Hc decreases. However, it is preferable to set the thickness of the Pt film to less than 12 Å.

Figure 11:
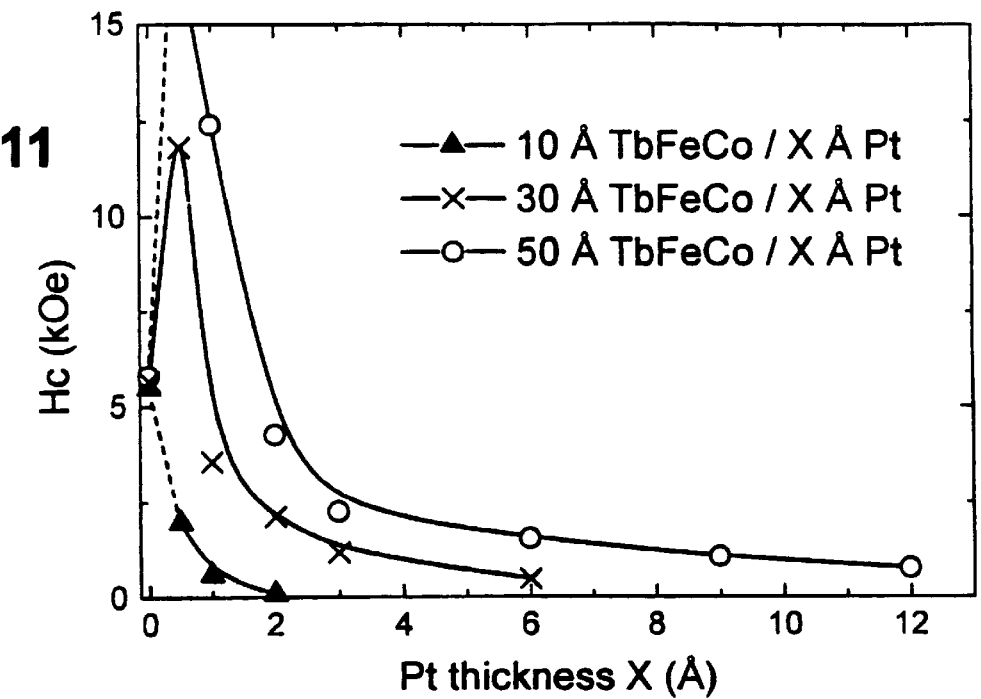
FIG. 11 is a diagram illustrating the relationships between a coercive force and a thickness of Pt of (10, 30, 50)ÅTbFeCo(Pt)/XÅPt films.

FIG. 11 shows a dependency on a Pt layer of the coercive force Hc (10 Å, 30 Å, 50 Å TbFeCo(Pt)/XÅPt). In the TbFeCo(Pt) film has a thickness of 30 or 50 Å, when the Pt layer is very thin, Hc increases and then sharply decreases. When the Pt layer is 6 Å, Hc is relatively small. In the 10 ÅTbFeCo film, Hc is small even when the Pt layer is 1 Å. Hence, in such a multilayer thin film, it is preferable to set the thickness of the Pt layer to 15 Å or less.

Figure 12:
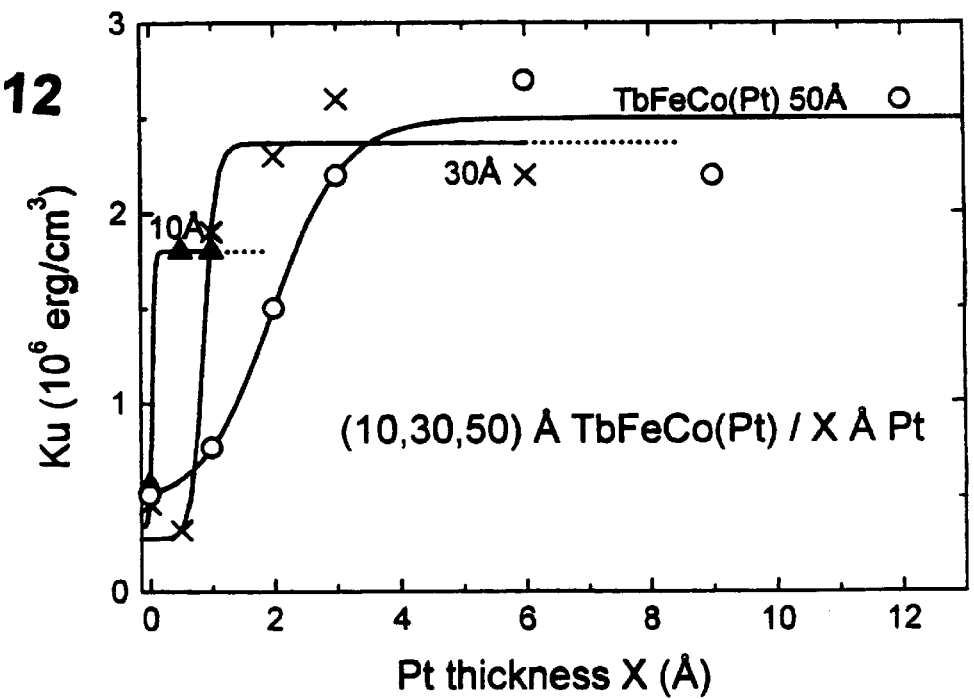
FIG. 12 is a diagram illustrating the relationships between a coercive force and a thickness of Pt of (10, 30, 50)ÅTbFeCo(Pt)/XÅPt films.

FIG. 12 shows a dependency on the thickness Pt of the vertical magnetic anisotropy coefficient Ku. In the 50 ÅTbFeCo film, Ku tends to be nearly saturated with the Pt layer of the thickness of about 3 Å or more.

Embodiment 2

A metal multilayer thin film TbFeCo/NdCo is laminated using, for example, the sputtering process. In FIG. 2, a NdCo layer is used as the y-layer. The total thickness of the film is about 500 Å.

Figure 13:
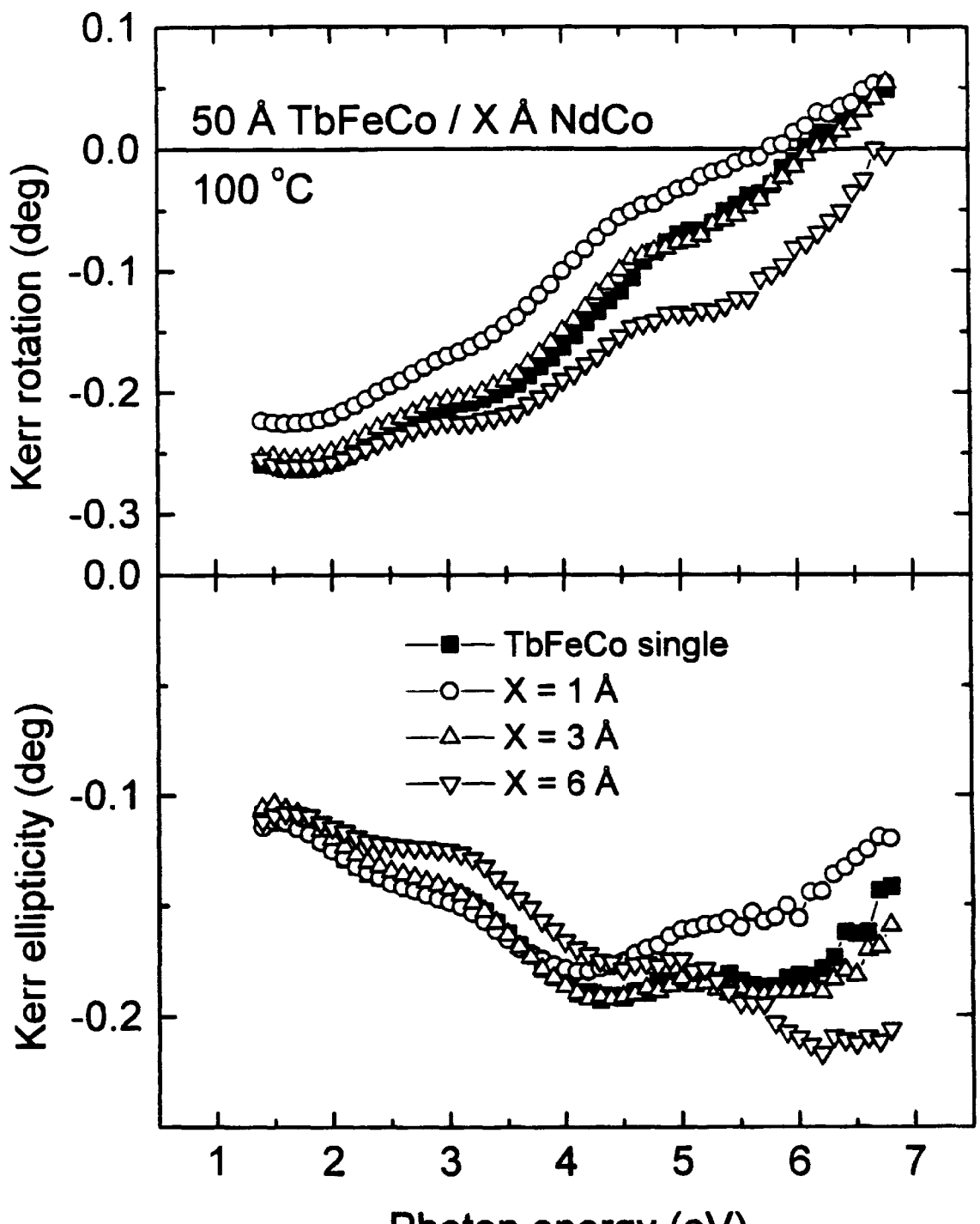
FIG. 13 is a diagram illustrating the dependency on photon energy of Kerr rotation angle and Kerr ellipticity of a 50 ÅTbFeCo/XÅNdCo film (where X=0, 1, 3, and 6)

FIG. 13 shows a dependency on photon energy of the Kerr rotation angle and Kerr ellipticity of a 50 ÅTbFeCo/XÅNdCo multilayer thin film (where X=1, 3, and 6 Å). The absolute layer of the Kerr rotational angle decreases when the Pt film has a thickness of 1 Å but decreases when the Pt thickness has a thickness of 3 Å or more. When the Pt film has a thickness of 6 Å or more, the absolute value of the Kerr rotation angle increases sharply. The Kerr ellipticity increases at more than about 5 eV with an increase in Pt.

Figure 14:
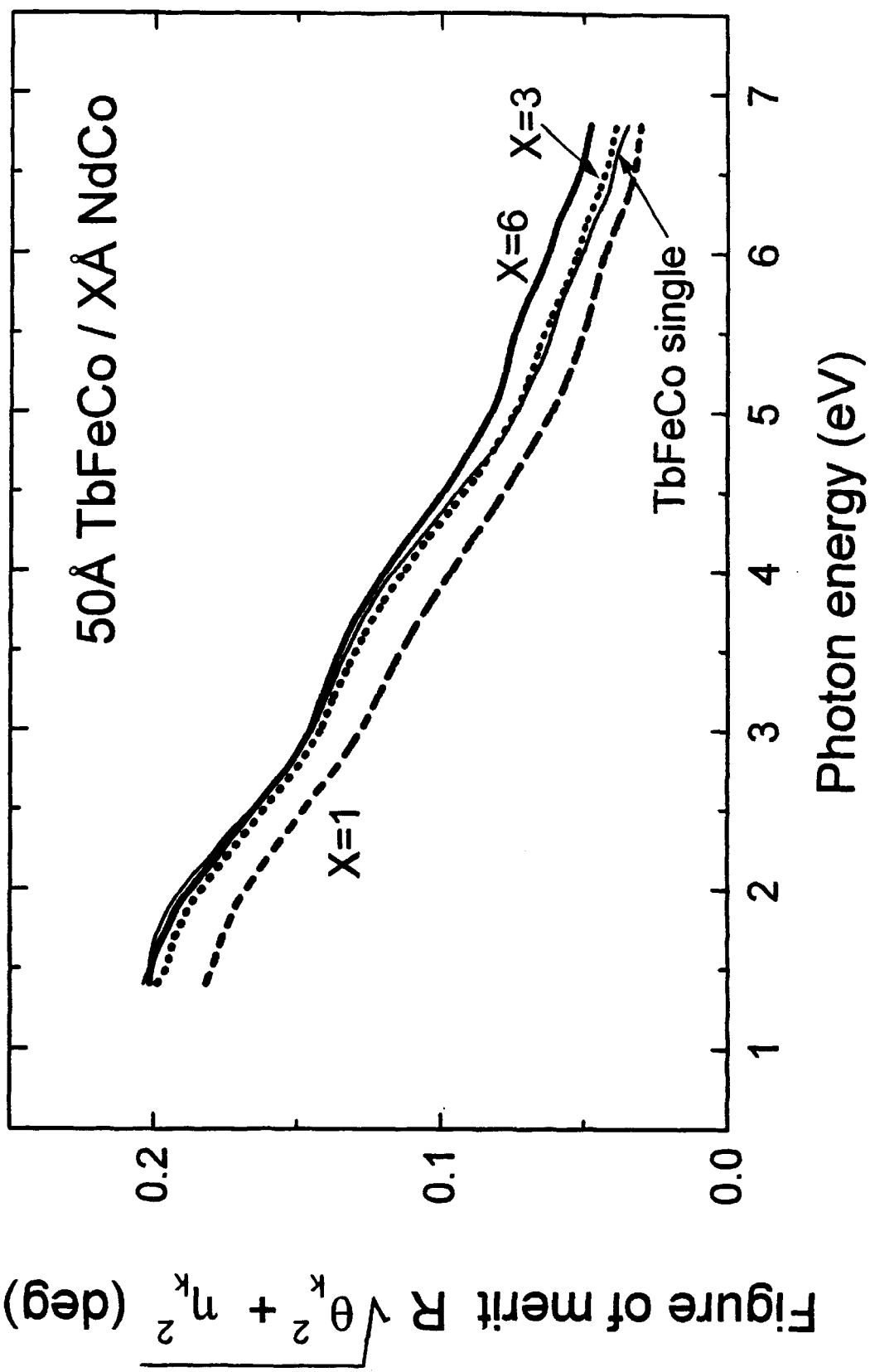
FIG. 14 is a diagram illustrating the dependency on photon energy of the FOM value of a b 50ÅTbFeCo/XÅNdCo film (where X=0, 1, 3, and 6)

FIG. 14 shows a dependency on photon energy of FOM value (=R$\sqrt{[\theta_k^2 + \eta_k^2]}$) of a 50 ÅTbFeCo/XÅNdCo multilayer thin film. The FOM value of the multilayer thin film corresponding to X=6 increases over all photon energy ranges, compared with that of the single-layer film.

Figure 15:
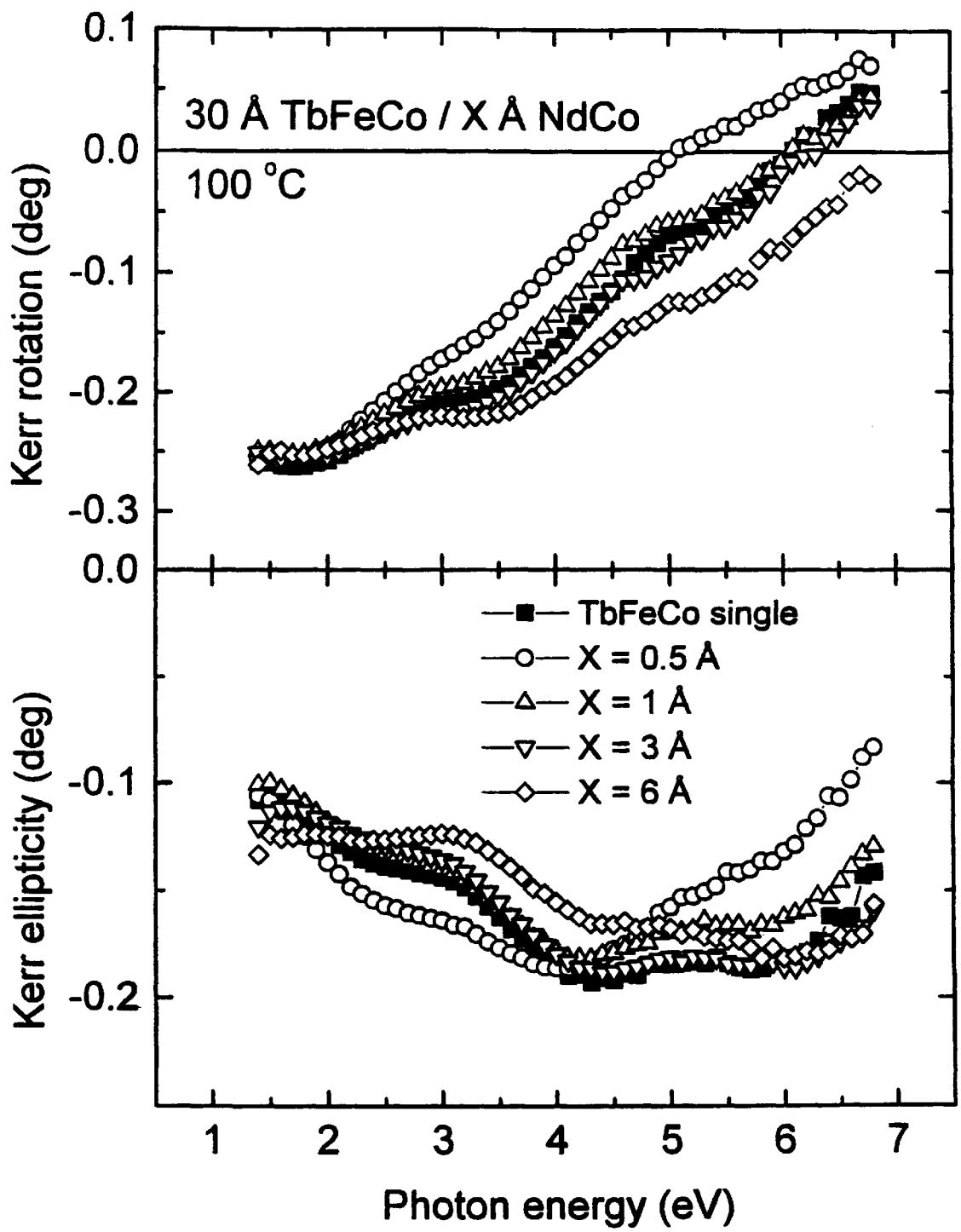
FIG. 15 is a diagram illustrating the dependency on photon energy of the Kerr rotation angle and Kerr ellipticity of a 30 ÅTbFeCo/XÅNdCo film (where X=0, 0.5, 1, 3, and 6)

FIG. 15 shows a dependency on photon energy of the Kerr rotation angle and Kerr ellipticity of a 30 ÅTbFeCo/XÅNdCo film (where X=0.5, 1, 3, and 6 Å). Particularly, when X=0.5 Å, both the absolute value of a Kerr rotation angle and the absolute value of a Kerr ellipticity are larger than that of the single layer film in the range of ultraviolet ray with a photon energy of 4 eV or more.

Figure 16:
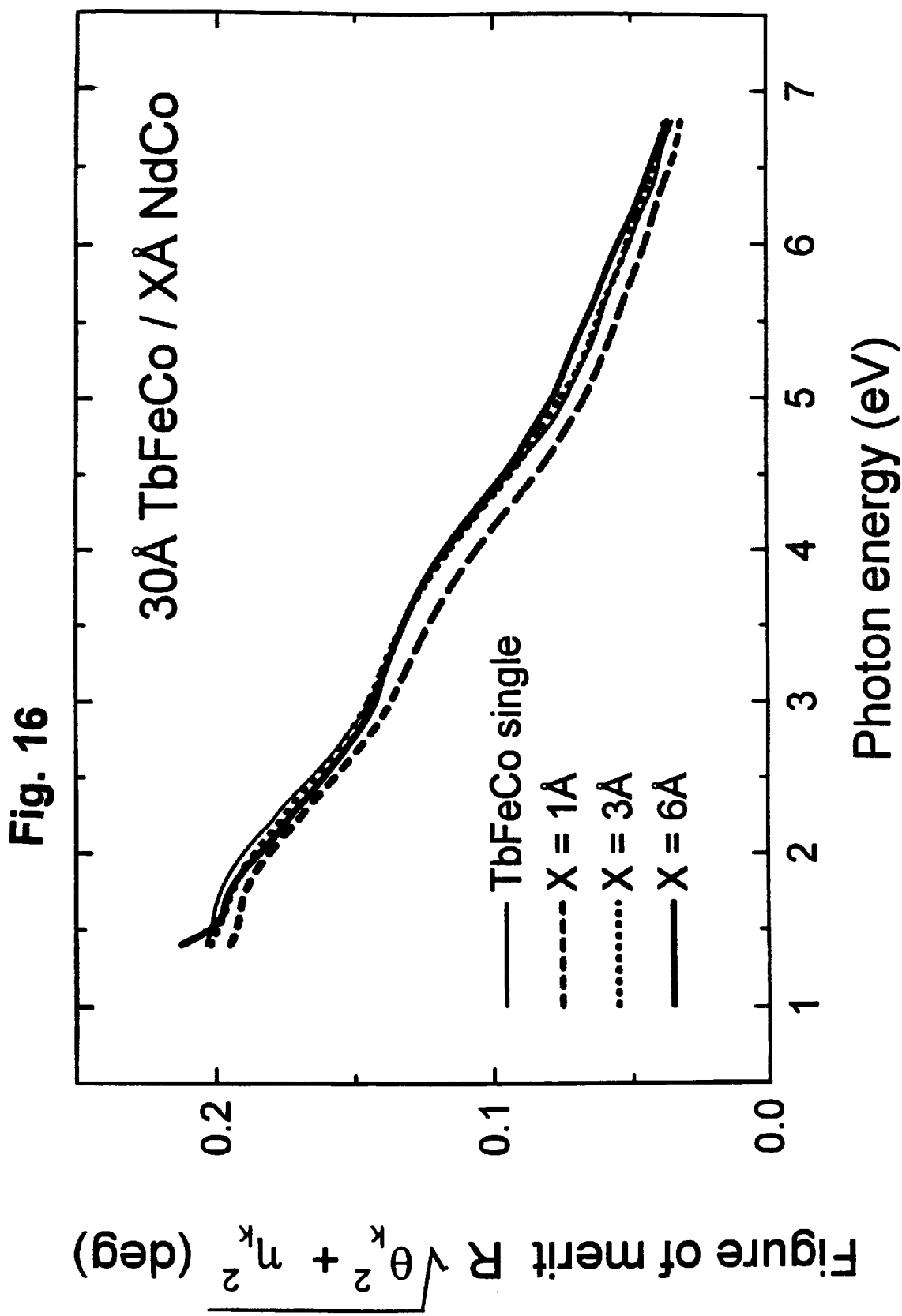
FIG. 16 is a diagram illustrating the dependency on photon energy of the FOM value of a 30 ÅTbFeCo/XÅNdCo film (where X=0, 1, 3, and 6)

FIG. 16 shows a dependency on photon energy of the FOM value of a 30 ÅTbFeCo/XÅNdCo film (where X=0.5, 1, 3, and 6 Å). When X=6, the FOM value of a multilayer thin film increases over a photon energy of more than 4 eV, as compared with that of a single layer film.

Figure 17:
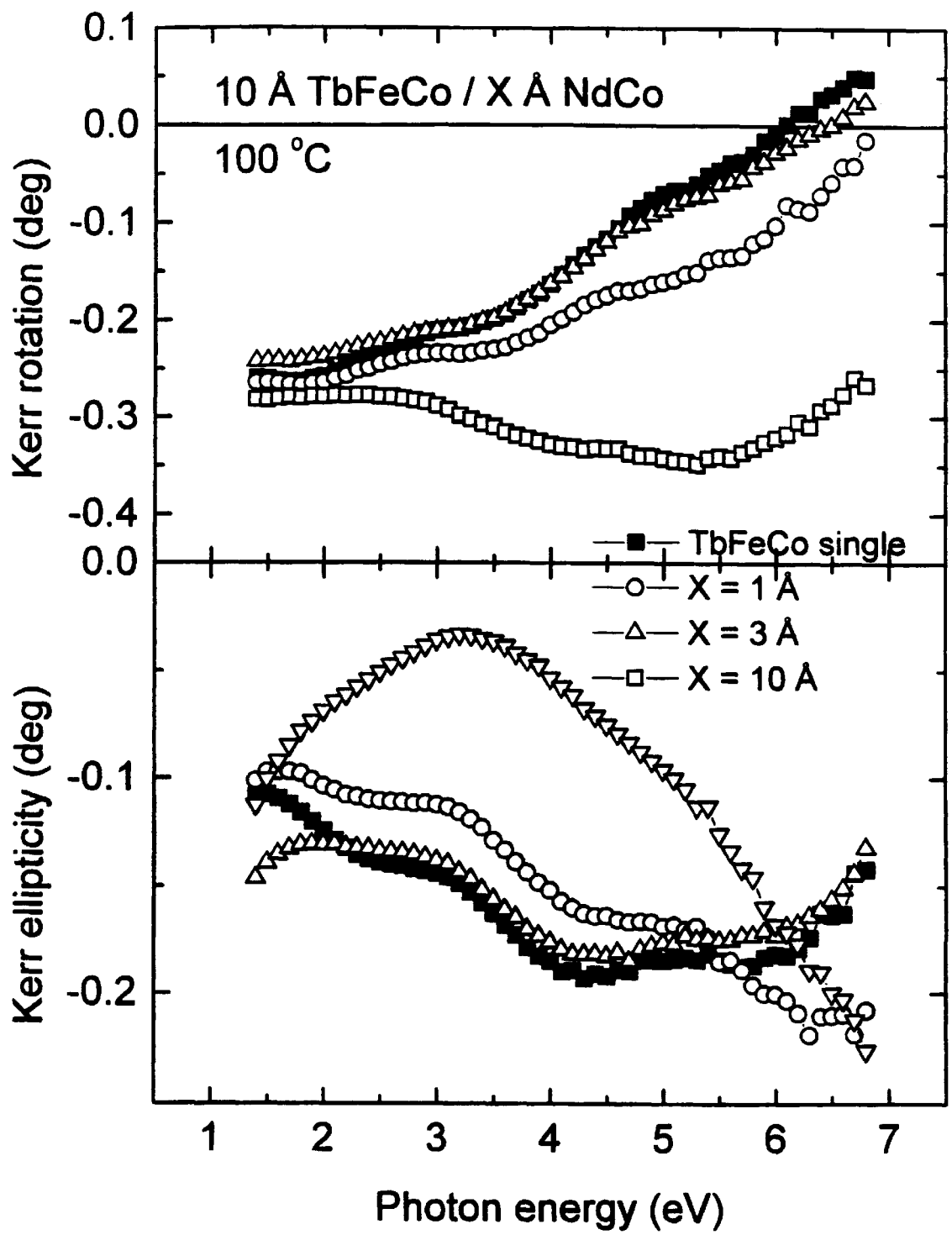
FIG. 17 is a diagram illustrating the dependency on photon energy of the Kerr rotation angle and Kerr ellipticity of a 10 ÅTbFeCo/XÅNdCo film (where X=0, 1, 3, and 10)

FIG. 17 shows a dependency on photon energy of the Kerr rotation angle and Kerr ellipticity of a 10 ÅTbFeCo/XÅNdCo film (where X=1, 3, and 10 Å). Particularly, in the case of X=3 and 10 Å, the absolute value of a Kerr rotation angle is comparatively larger than that of the single film layer.

Figure 18:
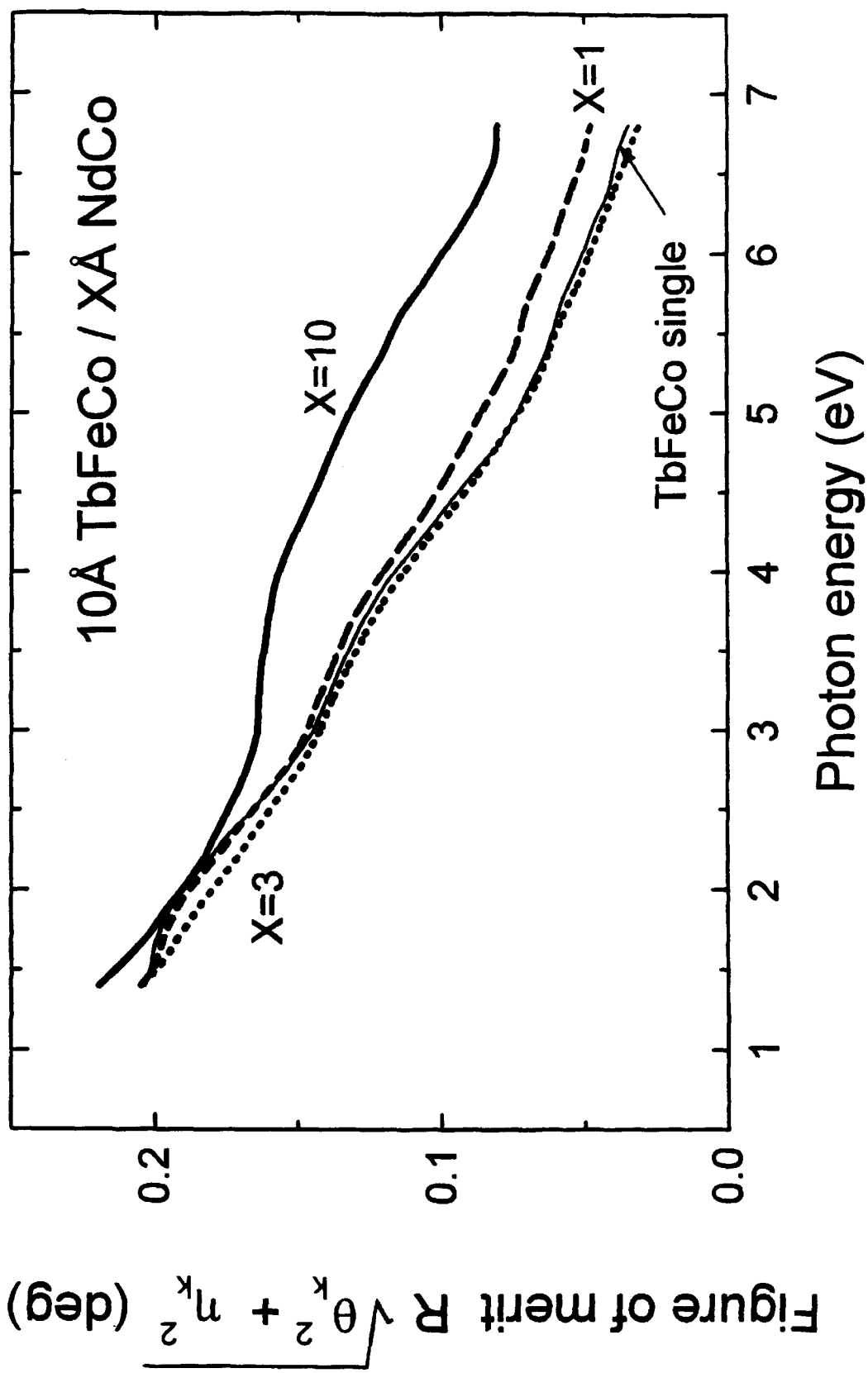
FIG. 18 is a diagram illustrating the dependency on photon energy of the FOM value of a 10 ÅTbFeCo/XÅNdCo film (where X=0, 1, 3, and 6)

FIG. 18 shows a dependency on photon energy of the FOM value of a 10 ÅTbFeCo/XÅNdCo film (where X=1, 3, and 10 Å). When X=10, the FOM value of the multilayer thin film largely increases over all photon energy ranges, as compared with that of the single layer film. Particularly, the tendency is noticeable over a photon energy of 3 eV or more. When X=1, the FOM value is sufficiently larger than that of the single film layer over a photon energy of 4 eV or more.

Figure 19:
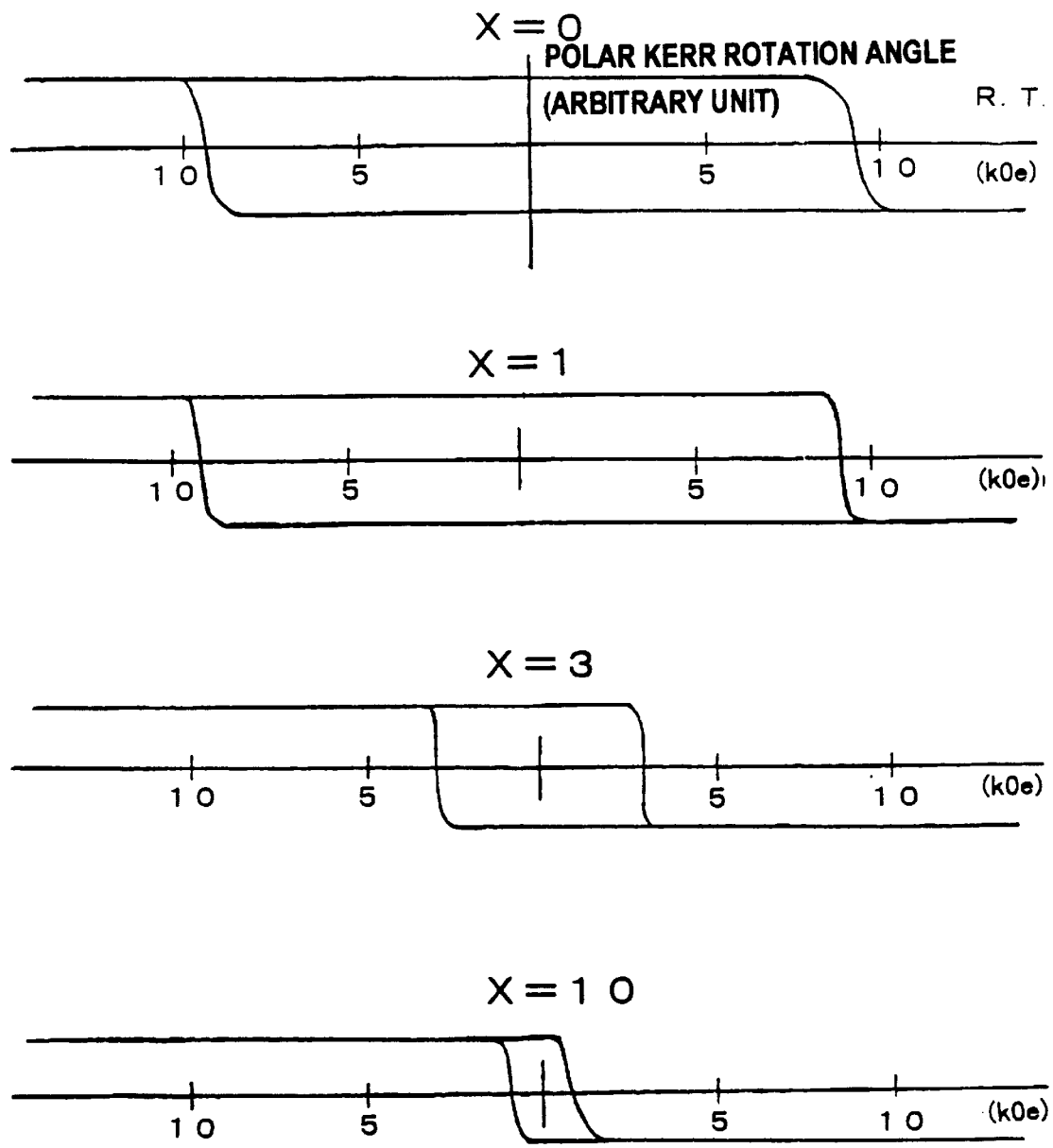
FIG. 19 is a diagram illustrating a hysteresis loop of a 10 ÅTbFeCo/XÅNdCo film (where X=0, 1, 3, and 10)

FIG. 19 shows a Kerr rotation angle hysteresis loop of 10 ÅTbFeCo/XÅNdCo multilayer thin film (where X=0, 1, 3, and 10). The multilayer thin film of (TbFeCo/NdCo) shows a high coercive force having a rectangular ratio of 1. When X=1 or 3, the multilayer thin film has a sufficient coercive force.

Figure 20:
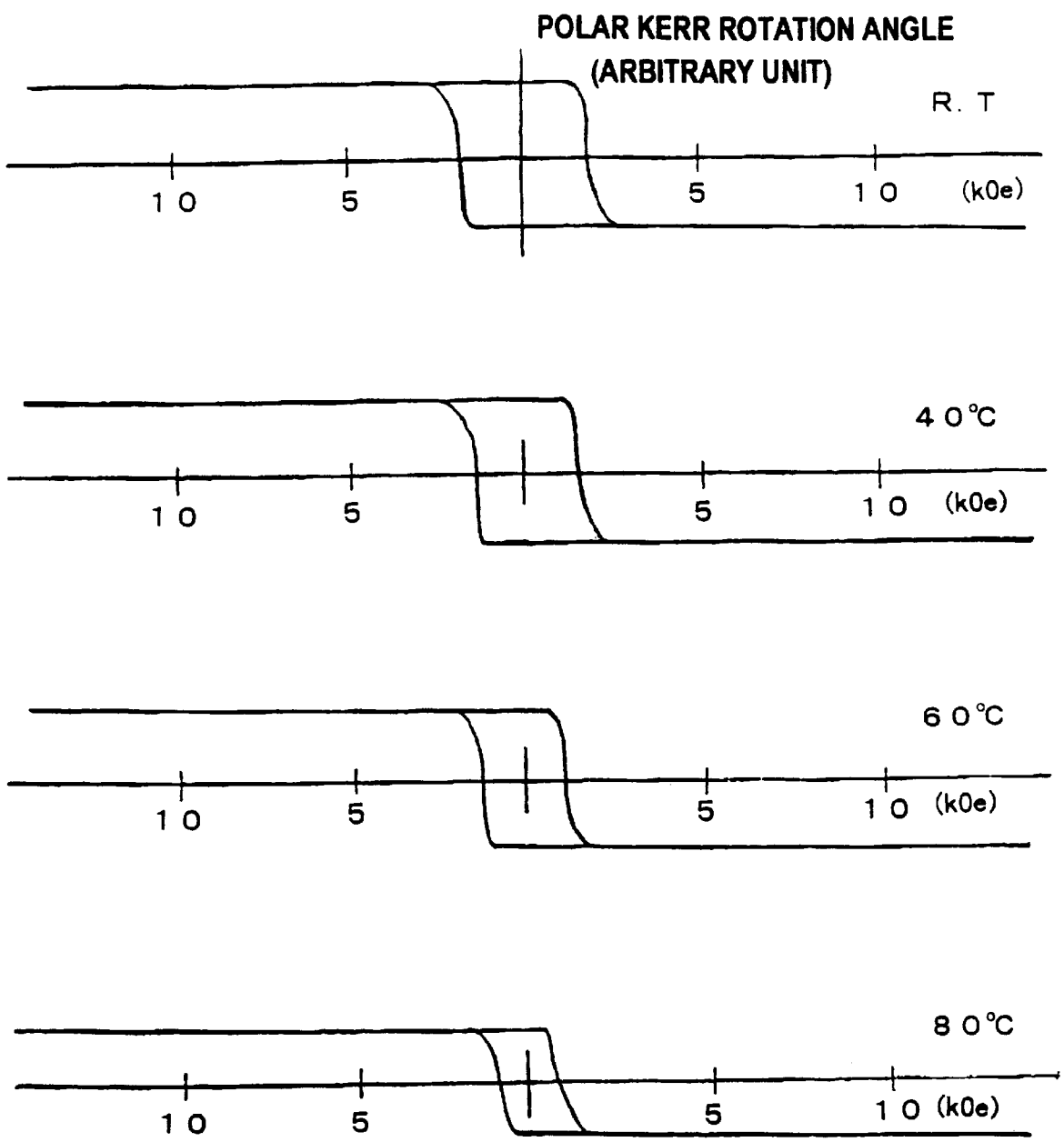
FIG. 20 is a diagram illustrating a hysteresis loop of 10 ÅTbFeCo/10 ÅNdCo film (at room temperatures of 40° C., 60° C., and 80° C.)

FIG. 20 shows the dependency on temperature of a hysteresis loop of the Kerr rotation angle of a ((10 ÅTbFeCo/10 ÅNdCo)×25) layer. This multilayer thin film indicates a rectangular ratio of 1 over the temperature ranges.

Figure 21:
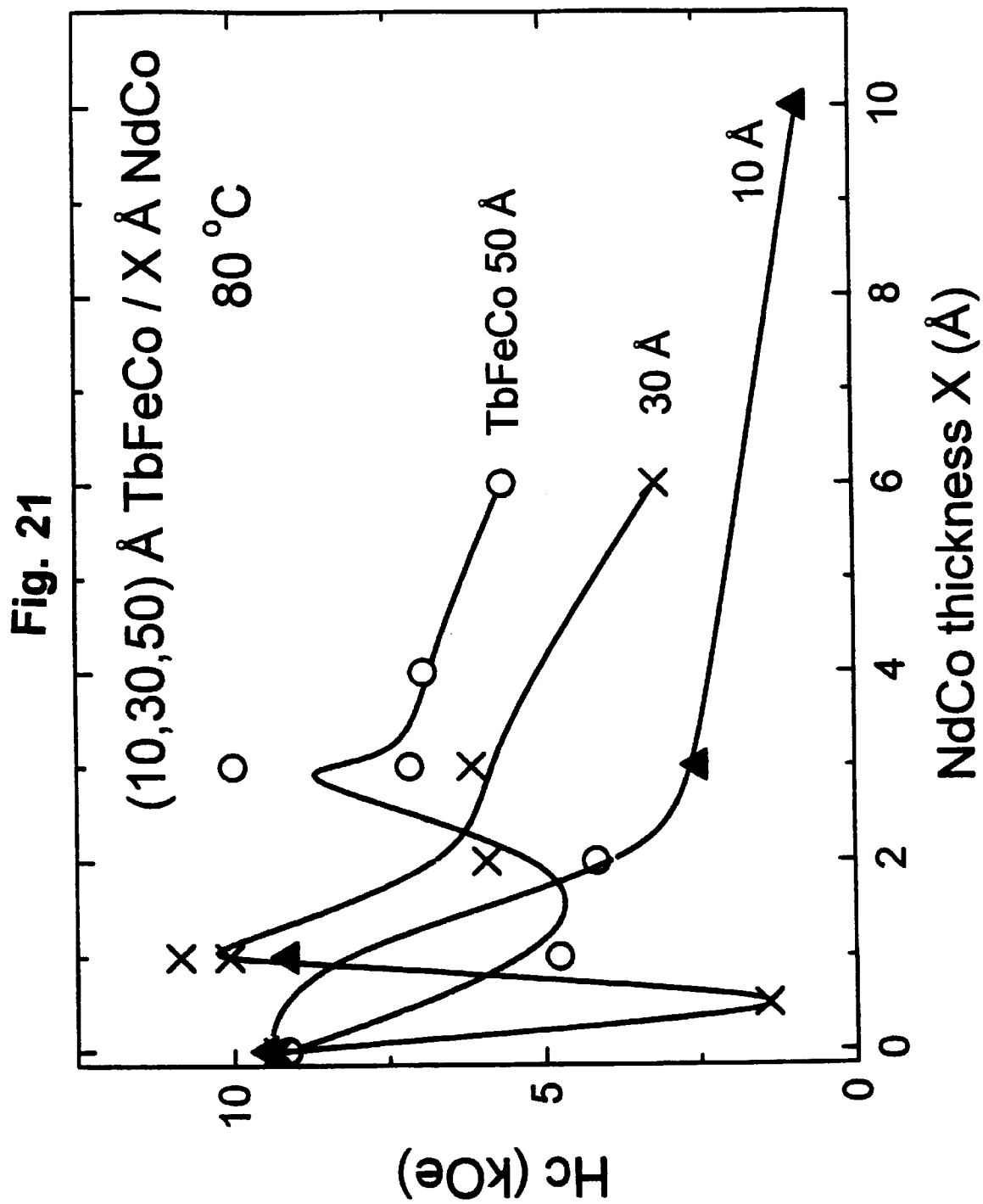
FIG. 21 is a diagram illustrating the dependency on thickness of NdCo of the coercive force of a (10, 30, 50)ÅTbFeCo/XÅNdCo film.

FIG. 21 shows the dependency on X of the coercive force of a (10, 30, 50)ÅTbFeCo/XÅNdCo film at a temperature of 80° C. As a hole, as the thickness of NdCo increases, the coercive force tends to decrease but is relatively large.

Embodiment 3

Figure 22:
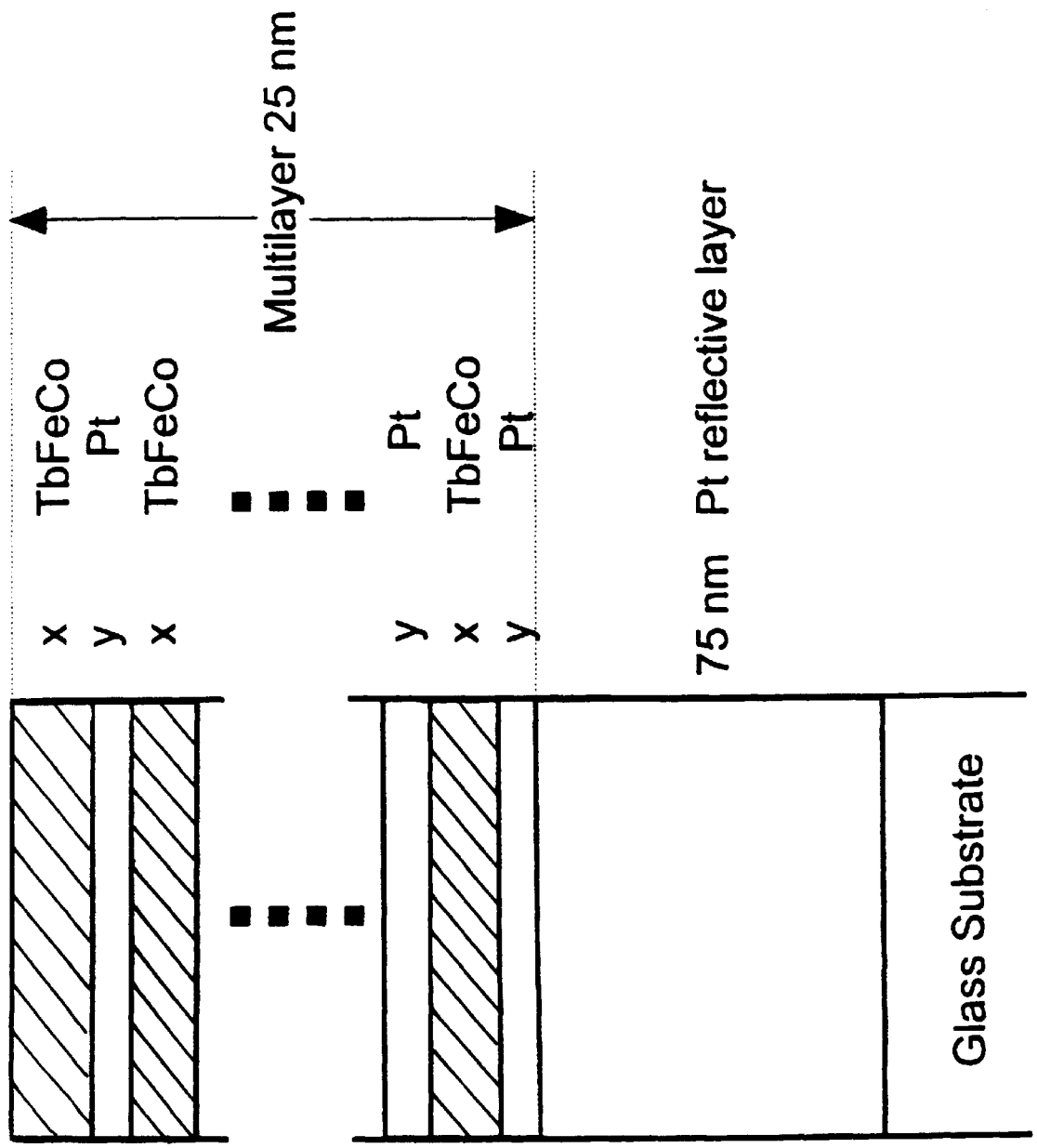
FIG. 22 is a diagram illustrating the configuration of a multilayer thin form according to the third embodiment.

A metal multilayer thin film TbFeCo/Pt is formed using, for example, the sputtering process. In the third embodiment, a Pt reflective layer of 75 nm is formed on a glass substrate, as shown in FIG. 22. y-layer (Pt layer) and x-layer (TbFeCo layer) are sequentially laminated on the reflective layer. The thickness of each of the layers x and y is 25 nm. In this embodiment, A Pt protective layer is not formed on the uppermost x-layer. Hence, it is considered that the quality of the multilayer thin film can be accurately checked, with the effect of the Pt protective layer precluded.

Figure 23:
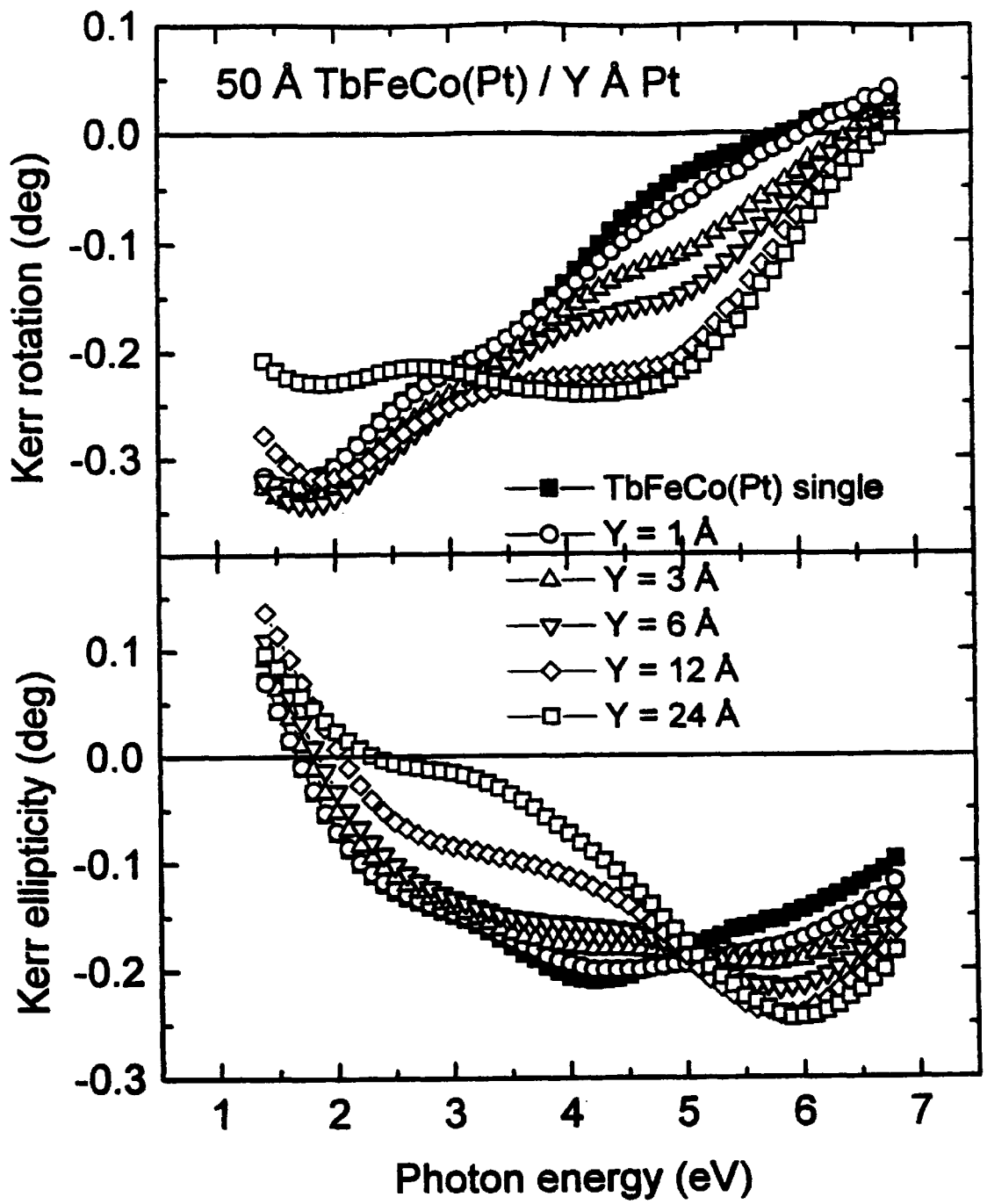
FIG. 23 is a diagram illustrating the dependency on photon energy of the Kerr rotation angle and Kerr ellipticity of a 50 ÅTbFeCo(Pt)/YÅPt film (where Y=0, 1, 3, 6, 12, and 24)

FIG. 23 shows a dependency on photon energy of the Kerr rotation angle and Kerr ellipticity of a 50 ÅTbFeCo(Pt)/YÅPt multilayer thin film (where Y=1, 3, 6 Å). The absolute value of the Kerr rotational angle of the multilayer thin film is larger than the single layer film at a photon energy of 4 eV or more. The thicker the thickness of the Pt layer, the larger the absolute value.

Figure 24:
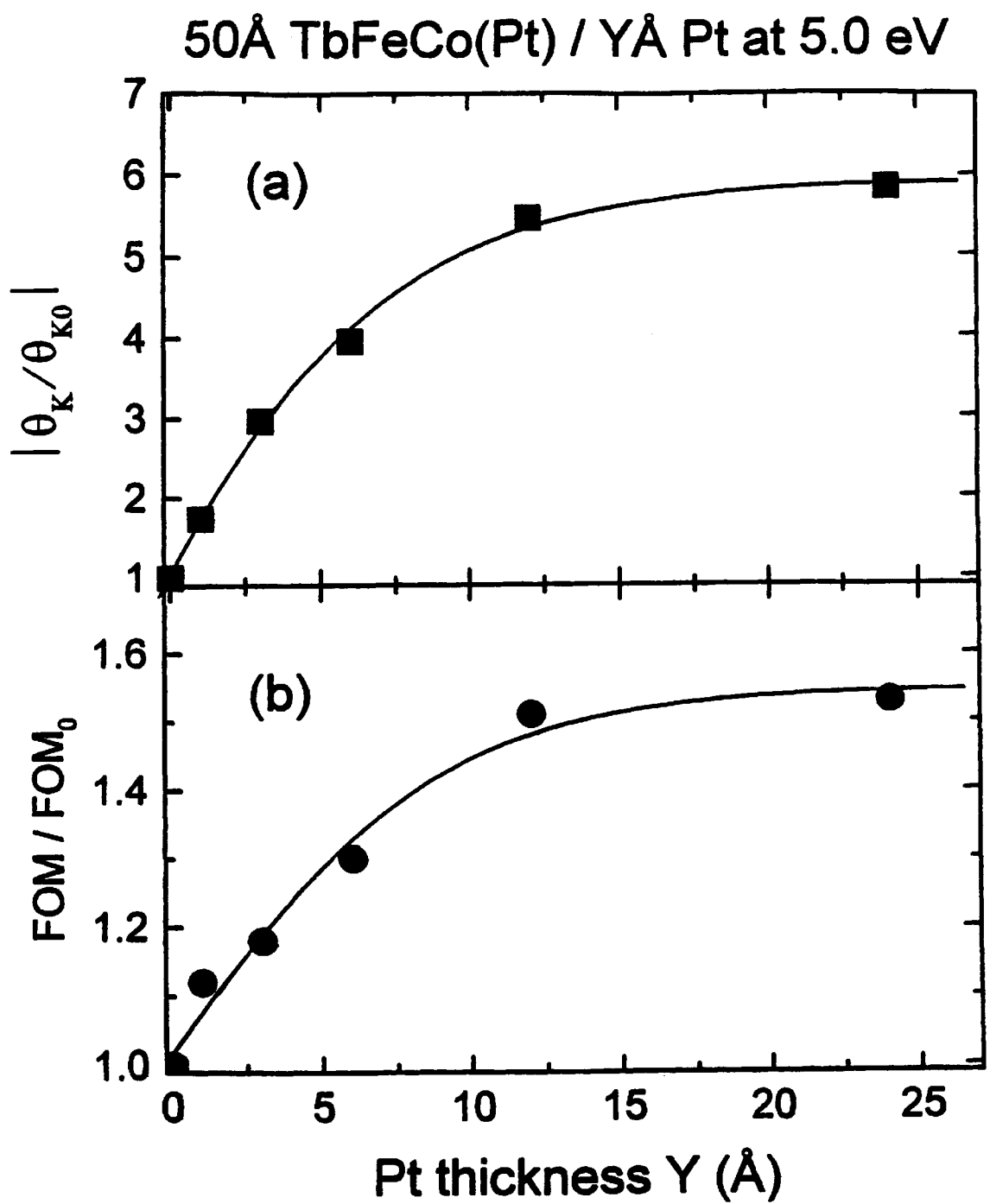
FIG. 24 is a diagram illustrating the dependency on thickness of Pt of the Kerr rotation angle and FOM value of a 50 ÅTbFeCo(Pt)/Y ÅPt(5 eV) film.

FIG. 24 shows the relationships between the thickness Y of a Pt layer, Kerr rotation angle ratio (the absolute value of a ratio to the Kerr rotation angle of a single layer), and FOM value ratio (a FOM value ratio of a single film) at a photon energy of 5 eV of a 50 ÅTbFeCo(Pt)/YÅPt multilayer thin film. The thicker the thickness of the Pt layer, the larger both the Kerr rotation angle ratio and FOM value ratio. The effect of the Pt layer is nearly saturated at the thickness Y of about 10 Å.

Figure 25:
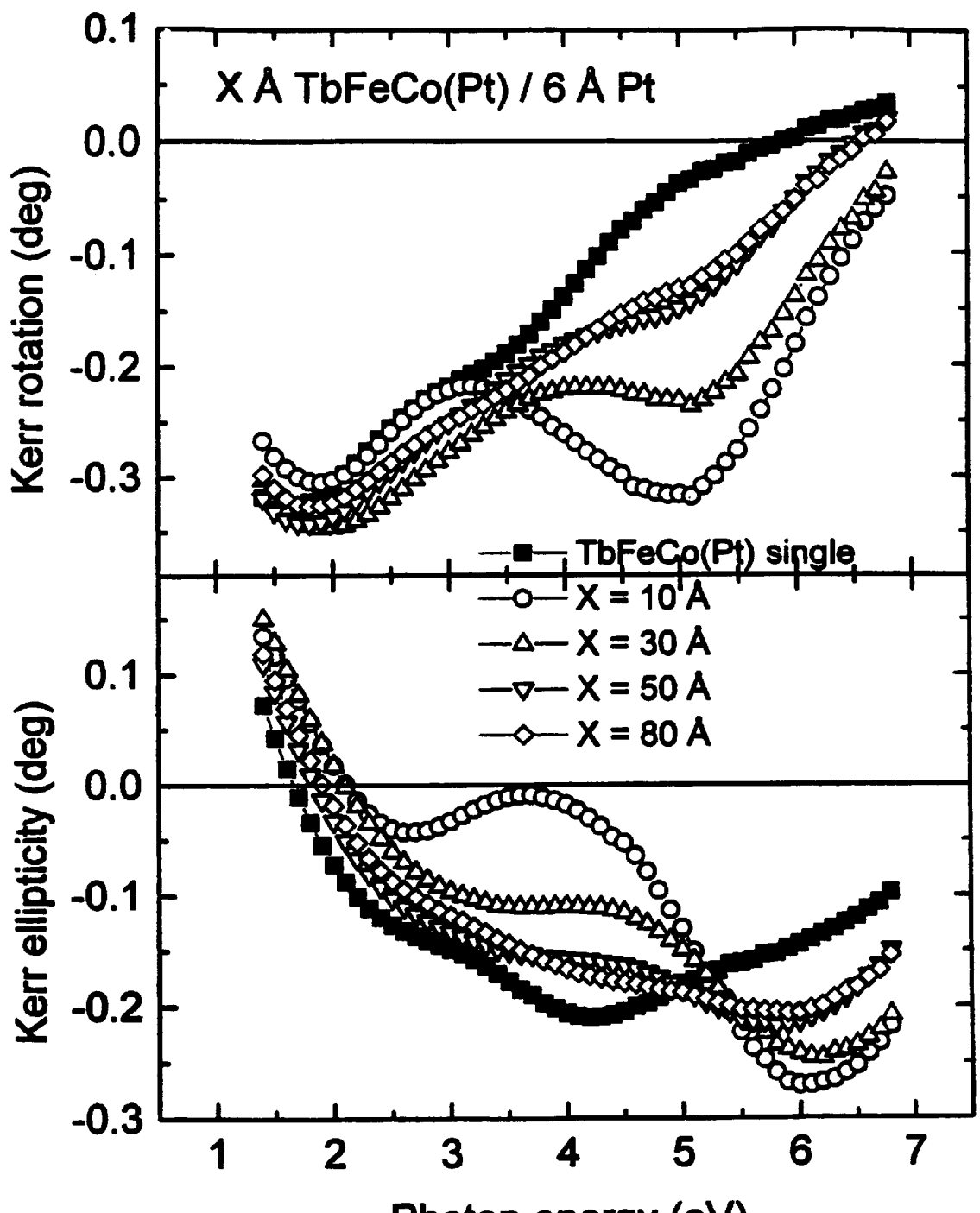
FIG. 25 is a diagram illustrating the dependency on photon energy of the Kerr rotation angle and Kerr ellipticity of a X ÅTbFeCo(Pt)/6 ÅPt film (where X=0, 10, 30, 50, and 80)

FIG. 25 shows a dependency on photon energy of both Kerr rotation angle and Kerr ellipticity of a XÅTbFeCo(Pt)/6ÅPt film. When the thickness X of a TbFeCo(Pt) is 10 Å, the absolute value of the Kerr rotation angle has a relatively large value (e.g. about −0.35) at a photon energy of about 5 eV. As the thickness X increase, the Kerr rotation angle becomes smaller at a photon energy of 5 eV. With the Pt layer disposed, the absolute value of the Kerr ellipticity becomes large at a photon energy of 5 eV or more. The thicker the Pt layer, the larger the absolute value of the Kerr ellipticity.

Figure 26:
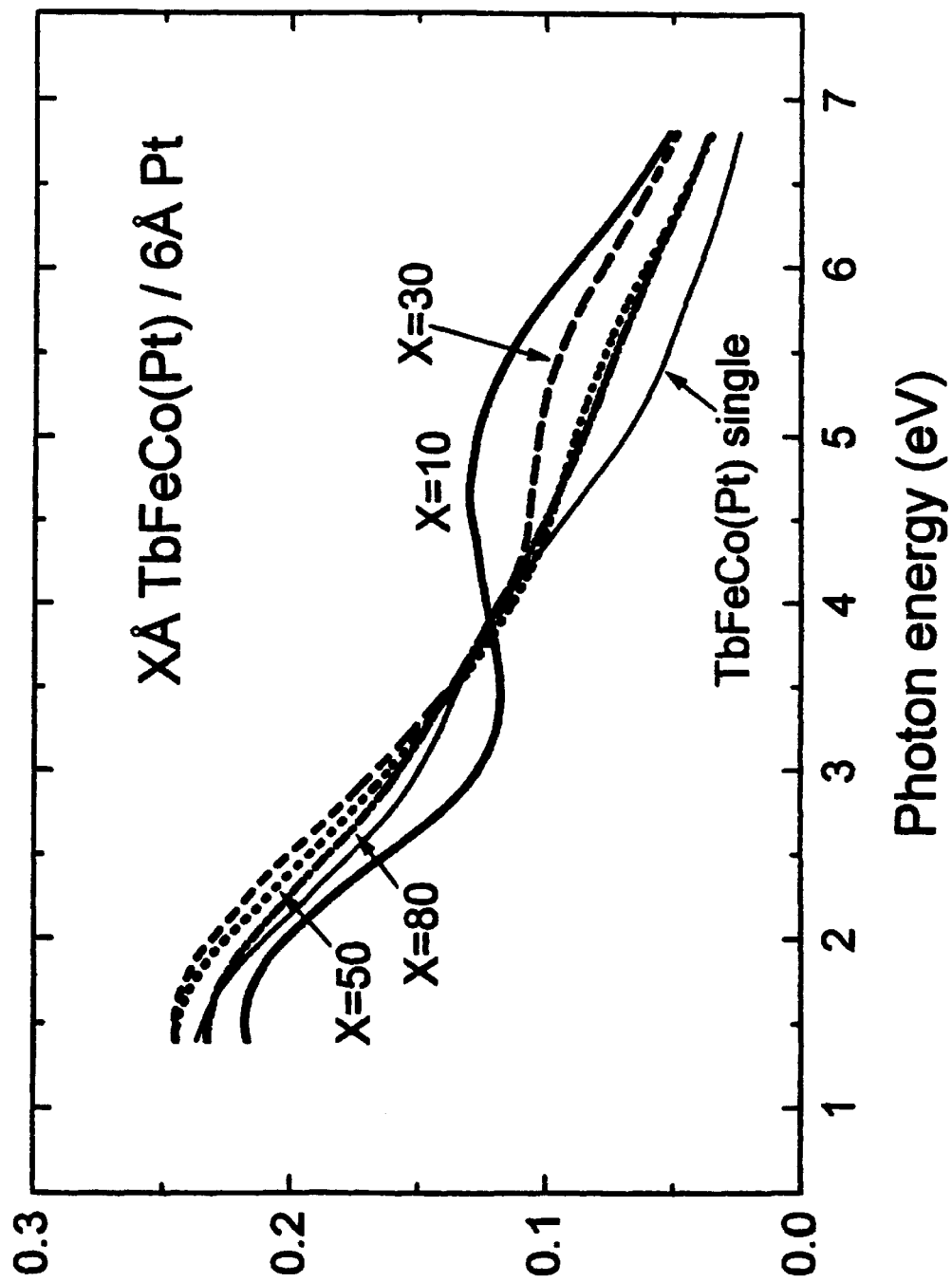
FIG. 26 is a diagram illustrating the dependency on photon energy of the Kerr rotation angle and Kerr ellipticity of a X ÅTbFeCo(Pt)/6 ÅPt film (where X=0, 10, 30, 50, and 80)

FIG. 26 shows a dependency on photon energy of the FOM value of a XÅTbFeCo(Pt)/6 ÅPt film. A multilayer thin film including a Pt layer has a larger FOM value than that of the single layer film. When the thickness X is 10 Å, the Pt layer has the highest FOM value. When X=30 Å, the Pt layer has a high FOM value. When X=50 and 80 Å, the Pt layer has nearly the same FOM value.

Figure 27:
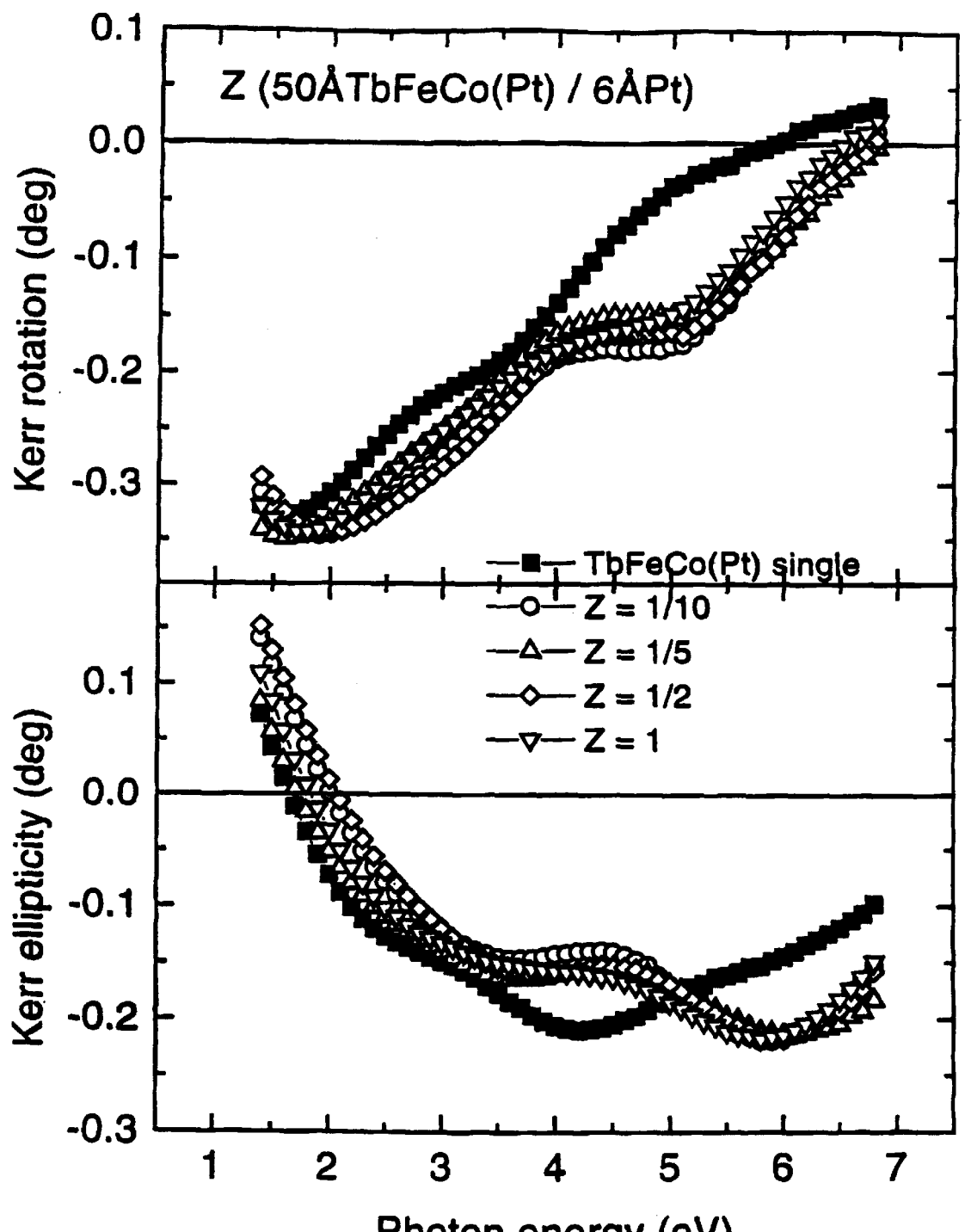
FIG. 27 is a diagram illustrating the dependency on photon energy of the Kerr rotation angle and Kerr ellipticity of a Z(50 ÅTbFeCo(Pt)/6 ÅPt) film (where Z=1/10, 1/5, 1/2, and 1)

FIG. 27 shows a dependency on photon energy of both Kerr rotation angle and Kerr ellipticity of a Z(50 ÅTbFeCo (Pt)/6 ÅPt) film, where Z represents the ratio of the thickness of each layer to the entire thickness in (50 ÅTbFeCo(Pt)/6 ÅPt). Z=1/10 means 5 ÅTbFeCo(Pt)/0.6 ÅPt. Z=1 means 50 ÅTbFeCo(Pt)/6 ÅPt. In the multilayer thin film, the absolute value of the Kerr rotation angle is larger than that of a single layer film. Particularly, the multilayer thin films has a much larger absolute value than a single layer film at a photon energy of 4 to 6 eV. At a photon energy of 3 to 5 eV, the absolute value of the Kerr ellipticity of the single layer film is larger than that of the multilayer thin film. At a photon energy of 5 eV or more, the absolute value of the Kerr ellipticity is larger than that of the single layer film.

Figure 28:
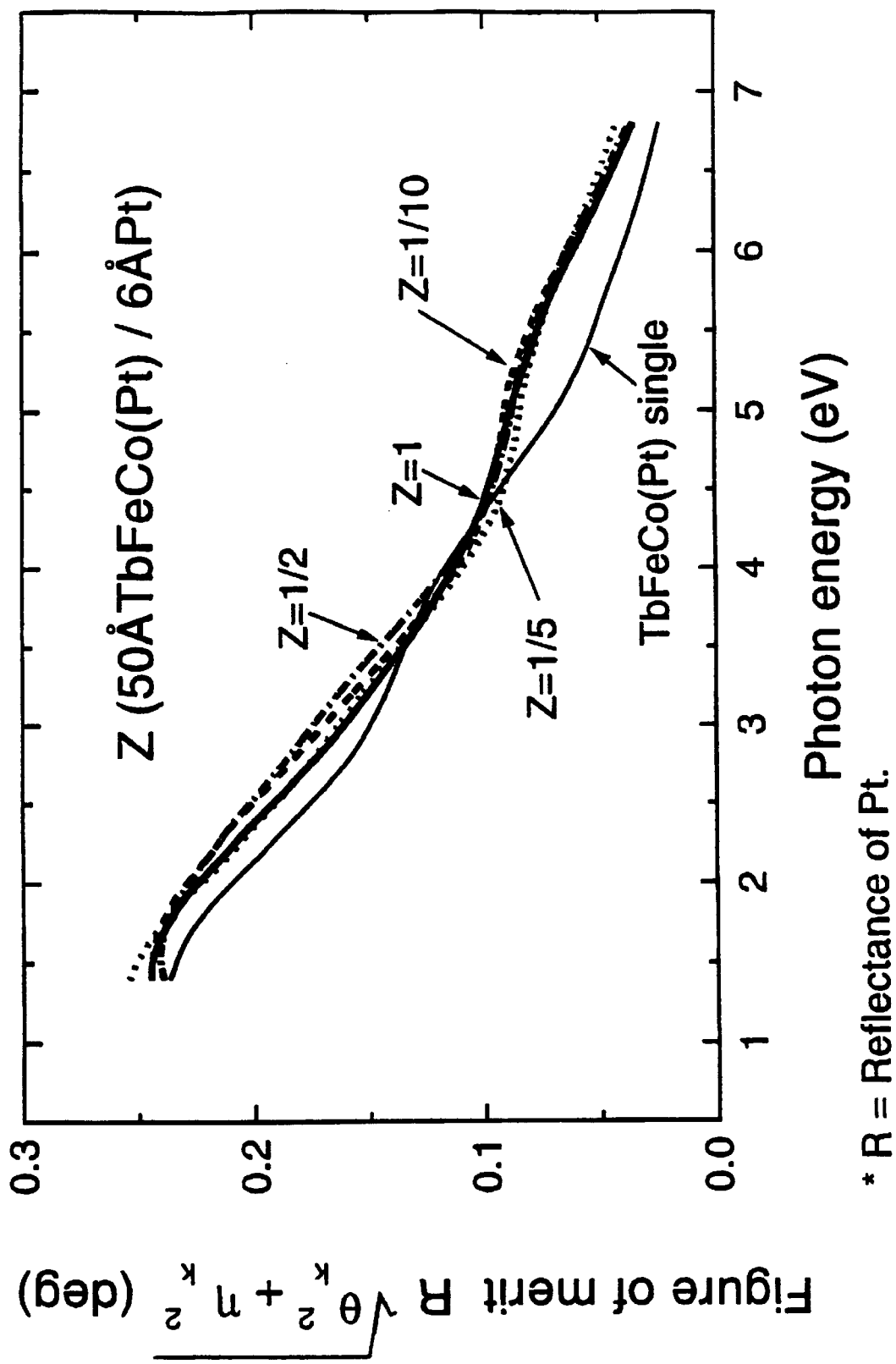
FIG. 28 is a diagram illustrating the dependency on photon energy of the FOM value of a Z(50 ÅTbFeCo(Pt)/6 ÅPt) film (where Z=1/10, 1/5, 1/2, and 1).

FIG. 28 shows a dependency on photon energy of the FOM value of a Z(50 ÅTbFeCo(Pt)/6 ÅPt) film. The multilayer thin film has a larger value than the single layer film at a photon energy of 4 eV or more.

As described above, according to the present invention, FOM (Figure of Merit) (=$R\sqrt{[\theta_k^2+\eta_k^2]}$ where $\theta_k$ is a Kerr rotation angle and $\eta_k$ is a Kerr ellipticity) is more than 0.05 in the range of ultraviolet rays (of a wavelength of 400 nm or less). This enables high density recording and reproduction using ultraviolet radiation in a small spot diameter.

Moreover, the metal thin film according to the present invention has a vertical magnetic anisotropic constant Ku larger than a magnetic energy of $2\pi Ms^2$ (where M is a saturated magnetization). Hence, the metal thin film has a vertical magnetic anisotropy being a radial magnetic anisotropy of a magnetooptical recording medium. High-density magnetooptical recording can be accomplished by using the metal thin film according to the present invention.

A multilayer thin film structure in which a (R–TM) or (R–TM–M) film and a M' film are alternately laminated can provide a sufficiently large FOM value, so that a more suitable magnetooptical recording medium with a large FOM value can be realized. The M' film having a thickness of 15 Å or less can provide a sufficient magnetooptic effect and maintain a coercive force equal to or greater than a predetermined value.

A multilayer thin film structure in which a (R–TM) or (R–TM–M) thin film and a M' thin film are laminated can provide a sufficiently large magnetooptic effect, a sufficient vertical magnetic anisotropy, and a hysteresis loop of a rectangular ratio of 1.

What is claimed is:

1. A magnetooptical recording medium, comprising:
a (R–TM) thin film, where R is a rare earth element of 15 to 50 atomic % and TM is an iron group transition metal; at least 70% of R being at least one of Tb and Dy and the remainder of R being at least one element selected from the group consisting of Y, La, Ce, Sm, Gd, Tb, Dy, Ho, Er, and Yb; and said TM being at least one of Fe and Co; the content of said Fe ranging from 0 to 100%; wherein
said magnetooptical recording medium has a vertical magnetic anisotropic constant Ku larger than a demagnetizing field energy of $2\pi Ms^2$ (where Ms is a saturated magnetization), and a FOM (Figure of Merit)=R$\sqrt{[\theta_k^2+\eta_k^2]}$ equal to or greater than 0.05 in a range of ultraviolet radiation of a wavelength of 400 nm or less, where $\theta_k$ is a Kerr rotation angle and $\eta_k$ is a Kerr ellipticity.

2. A magnetooptical recording medium, comprising:
a (R–TM–M) thin film, where R is a rare earth element of 15 to 50 atomic %, TM is an iron group transition metal and M is a metal; at least 70% of R being at least one of Tb and Dy, and the remainder of R being at least one element selected from the group consisting of Y, La, Ce, Sm, Gd, Tb, Dy, Ho, Er, and Yb; and said TM being at least one of Fe and Co; the content of said Fe ranging from 0 to 100%; M being at least one element selected from the group consisting of Pt, Ta, Pd, Zr, Nb, Mo, Ru, Rh, Cu, Ag, Au, and W; wherein said magnetooptical recording medium has a vertical magnetic anisotropic constant Ku larger than a demagnetizing field energy of $2\pi Ms^2$ (where Ms is a saturated magnetization), and a FOM (Figure of Merit)=R $\sqrt{[\theta_k^2+\eta_k^2]}$ equal to or greater than 0.05 in a range of ultraviolet radiation with a wavelength of 400 nm or less, where $\theta_k$ is a Kerr rotation angle and $\eta_k$ is a Kerr ellipticity.

3. A magnetooptical recording medium, comprising:

a multilayer thin film formed of a (R–TM) thin film and a M' thin film, where R is a rare earth element of 15 to 50 atomic % and TM is an iron group transition metal; at least 70% of R being at least one of Tb and Dy and the remainder of R being at least one element selected from the group consisting of Y, La, Ce, Sm, Gd, Tb, Dy, Ho, Er, and Yb; and said TM being at least one of Fe and Co; and the content of said Fe ranging from 0 to 100%; wherein said M' thin film being formed of at least one element selected from the group consisting of Pt, Ta, Pd, Zr, Nb, Mo, Ru, Rh, Cu, Ag, Au, and W; and said magnetooptical recording medium has a vertical magnetic anisotropic constant Ku larger than a demagnetizing field of energy of $2\pi Ms^2$ (where Ms is a saturated magnetization), and a FOM (Figure of Merit)=R$\sqrt{[\theta_k^2+\eta_k^2]}$ of 0.05 or more in a range of ultraviolet radiation with a wavelength of 400 nm or less, where $\theta_k$ is a Kerr rotation angle and $\eta_k$ is a Kerr ellipticity.

4. A magnetooptical recording medium, comprising:

a multilayer thin film formed of a (R–RM–M) thin film and a M' thin film, where R is a rare earth element of 15–50 atomic %, TM is an iron group transition metal, M is a metal, at least 70% or R is at least one of Tb and Dy, with the remaining R being at least one element selected from the group consisting of Y, La, Ce, Sm, Gd, Tb, Dy, Ho, Er, and Yb, said TM being at least one of Fe and Co, the content of said Fe ranging from 0 to 100%, and M being at least one element selected from the group consisting of Pt, Ta, Pd, Zr, Nb, Mo, Ru, Rh, Cu, Ag, Au, and W; wherein said M' thin film is formed of at least one element selected from the group consisting of Pt, Ta, Pd, Zr, Nb, Mo, Ru, Rh, Cu, Ag, Au, and W; and said multilayer thin film has a vertical magnetic anisotropic constraint Ku larger than a demagnetizing field of energy of $2\pi Ms^2$ (where Ms is a saturated magnetization), and a FOM (Figure of Merit)=R $\sqrt{[\theta_k^2+\eta_k^2]}$ greater than or equal to 0.05 in a range of ultraviolet radiation with a wavelength of 400 nm or less, where $\theta_k$ is a Kerr rotation angle and $\eta_k$ is a Kerr ellipticity.

5. A magnetooptical recording medium, comprising:

a multilayer thin film formed of a (R–TM) thin film and a (R'+TM') thin film, where R is a rare earth element of 15 to 50 atomic % and TM is an iron group transition metal, at least 70% of R being at least one of Tb and Dy and the remainder of R being at least one element selected from the group consisting of Y, La, Ce, Sm, Gd, Tb, Dy, Ho, Er, and Yb, said TM being at least one of Fe and Co, and the content of said Fe is in a range of 0 to 100%; wherein said (R'+TM') thin film contains R', and TM', where R' is a rare earth element of at least one of Nd and Pr of 20 to 80 atomic % and the remainder of R' contains at least one element selected from the group consisting of Y, La, Ce, Sm, Gd, Tb, Dy, Ho, Er, and Yb, and where TM' contains at least one of Fe and Co; and said magnetooptical recording medium has a vertical magnetic anisotropic constant Ku larger than a demagnetizing field energy of $2\pi Ms^2$ (where Ms is a saturated magnetization), and a FOM (Figure of Merit)=R $\sqrt{[\theta_k^2+\eta_k^2]}$ greater than or equal to 0.05 in a range of ultraviolet radiation of a wavelength of 400 nm or less, where $\theta_k$ is a Kerr rotation angle and $\eta_k$ is a Kerr ellipticity.

6. A magnetooptical recording medium, comprising:

a multilayer thin film formed of a (R–TM–M) thin film and a (R'–TM') thin film, where R is a rare earth element of 15 to 50 atomic %, TM is an iron group transition metal, M is a metal, at least 70% of R is at least one of Tb and Dy, and the remainder of R is at least one element selected from the group consisting of Y, La, Ce, Sm, Gd, Tb, Dy, Ho, Er, and Yb, said TM contains at least one of Fe and Co, the content of said Fe is in a range of 0 to 100%, and M is at least one element selected from the group consisting of Pt, Ta, Pd, Zr, Nb, Mo, Ru, Rh, Cu, Ag, Au, and W; wherein said (R'+TM') thin film contains R' and TM', where R' is a rare earth element of at least one of Nd and Pr of 20 to 80 atomic % and the remainder of R' contains at least one element selected from the group consisting of Y La, Ce, Sm, Gd, Tb, Dy, Ho, Er, and Yb, and where TM' contains at least one of Fe and Co; and said multilayer thin film has a vertical magnetic anisotropic constant Ku larger than a demagnetizing field energy) of $2\pi Ms^2$ (where Ms is a saturated magnetization), and a FOM (Figure of Merit)=R $\sqrt{[\theta_k^2+\eta_k^2]}$ greater than or equal to 0.05 in a range of ultraviolet radiation of a wavelength of 400 nm or less, where $\theta_k$ is a Kerr rotation angle and $\eta_k$ is a Kerr ellipticity.

7. The magnetooptical recording medium defined in claim 3, wherein said M' thin film has a thickness of 15 Å or less.

8. The magnetooptical recording medium defined in claim 4, wherein said M' thin film has a thickness of 5 Å or less.

* * * * *